US011567010B2

(12) United States Patent
Sirat

(10) Patent No.: US 11,567,010 B2
(45) Date of Patent: Jan. 31, 2023

(54) DARK TRACKING, HYBRID METHOD, CONICAL DIFFRACTION MICROSCOPY, AND DARK ADDRESSING

(71) Applicant: Bioaxial SAS, Paris (FR)

(72) Inventor: Gabriel Y Sirat, Paris (FR)

(73) Assignee: Bioaxial SAS, Paris (FR)

( * ) Notice: Subject to any disclaimer, the term of this patent is extended or adjusted under 35 U.S.C. 154(b) by 6 days.

(21) Appl. No.: 17/110,018

(22) Filed: Dec. 2, 2020

(65) Prior Publication Data

US 2021/0190691 A1    Jun. 24, 2021

Related U.S. Application Data

(60) Provisional application No. 62/942,559, filed on Dec. 2, 2019.

(51) Int. Cl.
  *G01N 21/64* (2006.01)
  *G02B 21/36* (2006.01)
(52) U.S. Cl.
  CPC ....... *G01N 21/6458* (2013.01); *G02B 21/365* (2013.01); *G01N 2201/066* (2013.01)
(58) Field of Classification Search
  CPC .................................................. G02B 21/365
  See application file for complete search history.

(56) References Cited

U.S. PATENT DOCUMENTS

| 9,250,185 | B2 | 2/2016 | Sirat | |
| 9,291,562 | B2 | 3/2016 | Hell | |
| 9,535,242 | B1 * | 1/2017 | Acosta | G02B 21/18 |
| 9,846,030 | B2 | 12/2017 | Sirat | |

(Continued)

FOREIGN PATENT DOCUMENTS

WO    WO 2019/043458 A2    3/2019

OTHER PUBLICATIONS

Balzarotti et al. Nanometer resolution imaging and tracking of fluorescent molecules with minimal photon fluxes, Science vol. 355, No. 6325, pp. 606-612 with 72 pages of Supplementary Materials (Year: 2017).*
European Patent Office, International Search Report and Written Opinion for PCT application No. PCT/IB2020/002009, dated Apr. 27, 2021, 22 pages.

(Continued)

*Primary Examiner* — Marcus H Taningco
(74) *Attorney, Agent, or Firm* — Sunstein LLP

(57) ABSTRACT

A super resolution technique, intended mainly for fluorescence microscopy, acquires the three-dimensional position of an emitter, through a hybrid method, including a number of steps.

In a first step the two-dimensional position of an emitter is acquired, using a technique, named in this application as an Abbe's loophole technique. In this technique a doughnut, or a combination of distributions, having a zero intensity at the combined center of the distributions, is projected onto the sample containing the emitter, under conditions wherein the doughnut null is moved towards the emitter to reach a position in which the emitter does not emit light.

In a second step, an axial measurement is obtained using a 3D shaping method, characterized by the fact that the emitted light is shaped by an additional optical module creating a shape of the light emitted by the emitter, this shape being dependent of the axial position and means to retrieve the axial position from the shape.

12 Claims, 9 Drawing Sheets

(56) References Cited

U.S. PATENT DOCUMENTS

2017/0023784 A1* 1/2017 Quintas Glasner de Medeiros .... G02B 21/18
2019/0121155 A1* 4/2019 Yu .......................... G06T 3/4053

OTHER PUBLICATIONS

Balzarotti, Francisco et al., "Nanometer resolution imaging and tracking of flourescent molecules with minimal photon fluxes." *Science* 355 (6325) pp. 606-612 (2017).

Berry, M., "Conical diffraction asymptotics: fine structure of Poggendorff rings and axial spike." *Journal of Optics A: Pure and Applied Optics* 6(4): 300 (2014).

Cnossen et al., "Localization microscopy at doubled precision with patterned illumination." *Nat. Methods*, 21 pp. (2020).

Contributors, "Super-resolution microscopy. In Wikipedia." 25 pages (2020).

Fallet, Clement et al., *A new method to achieve tens of nm axial super-localization based on conical diffraction PSF shaping*. Single Molecule Spectroscopy and Superresolution Imaging VIII, International Society for Optics and Photonics (2015).

Hamilton, W.R. et al., "Third supplement to an essay on the theory of systems of rays." *The Transactions of the Royal Irish Academy*, vol. 17, 151 pages (1831).

Jouchet, P. et al., "In Depth 3D Single Molecule Localization Microscopy with Time Modulated Excitation." *Biophysical Journal* 118(3): 149a. (2020).

Lloyd, H., "On the phenomena presented by light in its passage along the axes of biaxial crystals," *The Transactions of the Royal Irish Academy*, vol. 17, pp. 145-157 (1881).

Lukosz, W., "Optical Systems with Resolving Powers Exceeding the Classical Limit," *J. Opt. Soc. Am.* 56, 1463-4471 (1966).

Martens, K.J. et al., "Integrating engineered point spread functions into the phasor-based single-molecule localization microscopy framework." *Methods*, pp. 107-115 (2021).

Pavani, S.R.P. at al., "Three-dimensional, single-molecule fluorescence imaging beyond the diffraction limit by using a double-helix point spread function." *Proceedings of the National Academy of Sciences* 106(9): 2995-2999 (2009).

Schermellah, L. et al., "A guide to super-resolution fluorescence microscopy." *Journal of Cell Biology* 190(2): 165-175 (2010).

Nye, J.F. et al., "Dislocations in wave trains", *Proc. R. Soc.* London, A. 336, 165-190 (1974).

Caron, Julien et al., "Conical diffraction illumination opens the way for low photoxicity super-resolution imaging", *Cell Adhesion & Migration*, 8:5, 430-439 (2014).

Soskin et al., "Singular optics," *Progr. in Optics*, vol. 42, pp. 219-276, 2001.

Gauthier G. et al., "Direct imaging of a digital-micromirror device for configurable microscopic optical potentials." *Optica* 3(10): pp. 1136-1143 (Oct. 2016).

Gu, L. et al., "Molecular resolution imaging by repetitive optical selective exposure." *Nature Methods* 16(11): 1114-1118 (Nov. 2019).

Gwosh, K.C. et al., "MINFLUX nanoscopy delivers multicolor nanometer 3D-resolution in (living) cells." *bioRxiv*: 734251 (Aug. 13, 2019).

Reymond, L. et al., "SIMPLE: Structured illumination based point localization estimator with enchanced precision." *Optics express* 27(17): 24578-24590 (Aug. 2019).

* cited by examiner

| entrée-sortie | droite | gauche | 0 | 45 | 90 | 135 |
|---|---|---|---|---|---|---|
| droite |  |  |  |  |  |  |
| gauche |  |  |  |  |  |  |
| 0 |  |  |  |  |  |  |
| 45 |  |  |  |  |  |  |
| 90 |  |  |  |  |  |  |
| 135 |  |  |  |  |  |  |

$s = \sqrt{x^2+y^2+z^2}$
$r = \sqrt{x^2+y^2}$

DARK TRACKING, HYBRID METHOD, CONICAL DIFFRACTION MICROSCOPY, AND DARK ADDRESSING

RELATED APPLICATIONS

This application claims the benefit of U.S. Provisional Patent Application No. 62/942,559, filed 2 Dec. 2019, titled "Efficient Three-Dimensional Superresolution Positioning Method," the entire contents of which are hereby incorporated by reference herein, for all purposes.

TECHNICAL FIELD

The present invention relates primarily to methods and apparatus for optical measurement, quantification and classification of biological objects using markers based on an inelastic interaction between the incident beam and the marker, such as, for example, fluorescent markers, including also other inelastic interaction, as Raman or multiphoton fluorescence. In this invention, referring to fluorescence or fluorophores, has to be understood as a simplification, for concision and clarity, for inelastic interactions. Embodiments of the present invention can also be applied to methods and apparatus for optical measurement, quantification and classification of non-stained biological objects. Embodiments of the present invention can also be applied to methods and apparatus for optical measurement, quantification and classification of non-biological objects as for example, but not limited to, semiconductors.

Introduction

The present invention relates primarily to a method and a measuring device. It finds applications in particular in microscopy, for example in the field of biology and the acquisition of biological information from optical observation.

We use the term "biological" to describe any biological entity in life sciences, regardless of its origin, eukaryote organisms, prokaryotes organisms, or virus and of the purpose of the observation, be it for research, diagnostic or therapeutic applications. This term includes the medical, human, animal, vegetal, virus or bacteria uses of the method and devices described.

A Microscope is an optical instrument generally used to view, analyze, or measure objects too small for the naked eye. Microscopy is used in the field of biology, for example, to observe, study and measure biological entities (objects) and their dynamics.

Definitions

As used this description and in any appended claims, the following terms will have the following specified meanings, unless the context requires otherwise:

A "set" includes at least one member.

In incoherent light, a "minimum" intensity includes an instance wherein the intensity is zero.

We refer to "lateral" to describe the plane perpendicular or non-parallel to the chief ray of an optical system, represented in the geometrical Optics paradigm and to "axial" for the direction of propagation, i.e. the chief ray in the geometrical formalism of Optics.

We refer to an "object", in imaging context, as the luminous distribution created by light impinging on a physical object. We assume, for simplicity sake, that this luminous object is a faithful representation of the physical object, even if we apply the same restrictions on the concordance between the physical object and the luminous distribution created introduced, for example, in 2010 by the inventor, (Sirat 2016), hereinafter, "Sirat 2016". We refer to the "object plane" as the physical plane in which the object is positioned. For a two-dimensional object, in this case, we assume that the Microscope is focused on the object plane; for a three-dimensional object, we refer to the plane at which the microscope is focused as the object plane, assuming that the operator had chosen, manually or automatically, a "best focus" in agreement with some adequate criterion. We refer to "imaging plane" for any (conjugated) plane which the microscope images, with adequate magnification, on the object positioned at the object plane, and, the "entrance plane" as the first—assuming the light is propagating backward from the laser through the microscope onto the object—intermediate plane. The entrance plane is imaging plane which is the closest to the laser.

The term "value" as used herein and in any appended claims shall refer to a real number characterizing a quantity associated with a parameter. It is to be understood that, in a practical context, the quantity associated with a parameter may be characterized within some range, constituting the accuracy of a measurement. In that case, the term "value" may be used as shorthand for a distribution of values.

The term "system ruler" is used as a quantitative value describing a characteristic scale of the system. In this invention we use, both for standard imaging and super-resolution systems, the diffraction limits—lateral and axial—as the system ruler. A value will be small and in many cases neglected, if it is "much smaller" than the System Ruler, where "much smaller" is defined as smaller by a factor of 3 or by a factor of ten or more, depending on the context.

The "temporality" is defined as the temporal properties. We refer to simultaneous to events occurring at the same time, and to "quasi-simultaneous" to describe a time regime in which several events are recorded at a high rate such that the measurements acquired will differ only marginally from the measurements which will have been acquired in a fully simultaneous measurement of the same events. In this invention, for concision and clarity, simultaneous will refer to both fully simultaneous events and quasi-simultaneous events.

The "Cartesian" axes carry their well-known meaning. A three-dimensional position of a point or an object can be decomposed in the measurement of the position along each one of any three orthogonal axes. As usual in Optics, we separate between the axis along the chief ray, in the geometrical optical formalism, referred to as z-axis or axial direction, and the two axes perpendicular to the chief ray, in the geometrical optical formalism, referred to as x and y axes, or lateral axes.

The "dimensionality" is defined as any one of the three physical or spatial properties of length, area, and volume. In geometry, a point is said to have zero dimension; a figure having only length, such as a line, has one dimension; a plane or surface, two dimensions; and a figure having volume, three dimensions.

The "dimensionality" of a geometrical feature shall refer to the dimensionality, of a corresponding idealized feature in the limit in which the size of the geometrical feature (such as the 'diameter' of a point object, or the 'width' of a line or the 'thickness' of a coating) is much smaller than the size in any other dimension and tends to be zero.

A "point" is a geometrical feature in two or three dimensions with zero dimensionality and zero size. It is an overstated simplification, erasing much information on real objects, but simplifying tremendously the assumptions and calculations.

We refer to an object with small but not negligible sizes, compared to the System ruler, in two-dimensions or in all the three dimensions, without distinguishing between the two cases—as "point-object". The terms small or negligible has to be appreciated compared with the system ruler. A point object is determined by its position and its size, which can be isotropic, or not, in two- or three-dimensions. But—and it differentiate it from a point—a point-object may consists of a structure, smaller than the diffraction limit, which characteristics may be of paramount importance. In many cases, this structure can be approximated by a geometrical model, and the information to be retrieved are the model's parameters. Most biological objects are, in diffraction limited or super-resolved optical systems, point-objects, and the a priori dismissal of the information carried by the point-object and its representation as a point is a tremendous loss. The differentiation between points and point-objects is of major importance in this invention, following a previous invention by the same inventor, {Shut, 2017 #12}, incorporated herein by reference in its entirety.

A "line" (and similarly other terms that refer to shapes that are one-dimensional in theory . . . ) shall refer to a geometrical feature (i.e., to a physical object, having a length, width and thickness), where the length is at least 5 times either the width or the thickness. A line object is defined following the same rationale as a point object.

A "line object" is mutatis mutandis, the lower dimensionality analog of the point-object, We refer to the "center" of a light distribution, or of a sequence or superposition of light distributions, mainly in conjunction to putting, at this position, a null intensity or an intensity much lower than the maximal intensity; the center as to be understood in a loose connotation, including any position close enough to the geometrical center of the distribution The usual definitions are used for: "optical diffraction limit", Rayleigh criterion, Airy disk and its radius and diameter. We use in the context of the invention, the terms of "super-resolution", "super-resolved", "super-resolution imaging" and "super-resolution microscopy" (with or without hyphen) to describe optical data acquisition, optical imaging and microscopy at a resolution higher than the optical diffraction limit. In imaging systems, the "Rayleigh criterion" is the generally accepted criterion for the minimum resolvable detail, even if the observed FWHM of a point or a line is, in many cases, used as a practical evaluation of the "diffraction limit", a qualitative term used commonly to quantify the minimum resolvable detail.

We use the shorthand term, "diffraction size in the entrance (intermediate) plane" to characterize, in the optical system the geometrical extent of the diffraction limit in an entrance or intermediate imaging plane. For a pixelated DMD or SLM, used for example in image projection, the normal system will use a pixel size of the order of the diffraction size in the entrance plane, because any additional resolution will be blurred by the diffraction phenomena. We will present a different strategy in this invention.

The "Abbe's resolution limit" as used herein is as found in (Schermelleh, Heintzmann et al. 2010), hereinafter "Schermelleh 2010", incorporated herein by reference: Abbe's famous resolution limit is so attractive because it simply depends on the maximal relative angle between different waves leaving the object and being captured by the objective lens to be sent to the image. It describes the smallest level of detail that can possibly be imaged with this PSF "brush". No periodic object detail smaller than this shortest wavelength can possibly be transferred to the image.

The expression "above the Abbe's limit" is defined to refer to an object containing periodic structures containing details smaller than any details of the system ruler, thus limited by the Abbe's limit. The rationale of this definition is that such an object contains spatial frequencies above the Abbe's circle of frequencies in the aperture plane.

In estimation theory and statistics, the "Cramér-Rao bound (CRB)" or, equivalently, the "Cramér-Rao lower bound (CRLB)", expresses a lower bound on the variance of estimators of a deterministic (fixed, though unknown) parameter. The precise definition employed herein is as provided in Wikipedia en.wikipedia.org/wiki/Cram % C3% A9r % E2%80%93Rao_bound, as accessed Nov. 30, 2020, which is incorporated herein by reference.

A "localized" light distribution, as the term is used herein, shall refer to a light distribution with energies concentrated on a small domain. A light distribution will be localized if the energies, outside a radius of 3.5*the half Rayleigh criteria are below 2.5% of the overall energy.

This invention description assumes that the optical system described is close to being "photon noise (or shot noise) limited", as described in Wikipedia en.wikipedia.org/wiki/Shot_noise, or is close to being photon noise limited, i.e. the Gaussian noise component is smaller than the equivalent of half the photon (or shot) noise. The optimal case is indeed a "photon noise limited" optical system as described and a "Gaussian noise limited" system will collect only part of the advantages of this invention but is still in the scope of this invention.

"Full width at half maximum" (FWHM) is an expression of the extent of a function given by the difference between the two extreme values of the independent variable at which the dependent variable is equal to half of its maximum value, from Wikipedia, en.wikipedia.org/wiki/Full_width_at_half_maximum, as accessed Nov. 30, 2020.

We refer to the usual definition of "Telecentricity" as presented, for example, in Wikipedia, en.wikipedia.org/wiki/Telecentric_lens, as accessed Nov. 30, 2020, and we distinguish telecentricities related to entrance pupil and exit pupil properties telecentricities as explained there.

The usual definitions are used for "fluorescence" en.wikipedia.org/wiki/Fluorescence, as accessed Nov. 30, 2020, and for "fluorophores" https://en.wikipedia.org/wiki/Fluorophore, as accessed Nov. 30, 2020.

We refer to "photobleaching" as the photochemical alteration of a dye or a fluorophore molecule such that it is permanently or temporary unable to fluoresce, as an adaptation of en.wikipedia.org/wiki/Photobleaching, as accessed Nov. 30, 2020.

We refer to "phototoxicity" as the mechanism in which, fluorescent molecules in their excited state, tend to react with molecular oxygen to produce free radicals that may damage subcellular components and compromise the entire cell. A second physical mechanism, similar but slightly different, "photodamage" has also to be considered to avoid dependence of the results of the experiment on the intensity of light projected on the sample.

We refer to a Digital micro mirror device—DMD in short—as described in en.wikipedia.org/wiki/Digital_micromirror_device, as accessed Nov. 30, 2020, to describe a chip which has on its surface several thousands, tens or hundred thousand microscopic mirrors; these microscopic mirrors are arranged in a rectangular array which correspond, whether used in projecting an image, to the pixels in the image to be displayed. The DMD may be used also as a component in optics and optical processing, mostly for image projection. We refer, as a shorthand language, to the individual mirrors of a DMD as pixels. The DMD pixels can be in an ON or an OFF mode; in the ON mode, the micro mirror reflects the light in the direct path, the direct path being the direction of light whether the pixelated DMD will have been replaced by a plain mirror, whether, in the OFF mode the micro mirror reflects the light in the indirect path, rotated by a fixed angle to the direct path. Both beams can be used in an optical system.

We refer to Spatial Light Modulator SLM, to describe an object that imposes a spatially varying modulation of amplitude, intensity, phase, or polarization on a beam of light. (en.wikipedia.org/wiki/Spatial_light_modulator, as accessed Nov. 30, 2020,) The SLM includes Liquid Crystal on Silicon LCOS and devices used in LCoS Displays using ferroelectric liquid crystals (FLCoS) or nematic liquid crystals (Electrically Controlled Birefringence effect). The SLM includes also Grating light valve GLV as described in en.wikipedia.org/wiki/Grating_light_valve, as accessed Dec. 2, 2020, whether all acronyms are defined in the previous reference. We refer to the direct path in a transmissive SLM, as the path of light for which the pixelated SLM is replaced by a plain optical transmissive element, or absorbing SLM, the most common case, only one path is available, unlike in the DMD.

We refer to "acousto-optic deflectors" (or acousto-optic deflection systems), as described en.wikipedia.org/wiki/Acousto-optics, as accessed Nov. 30, 2020, to describe devices able to shift angularly, or to focus, a light beam using the Acousto-optic effect, in 1D, 2D or as a focusing mechanism. Multichannel Acousto-optic deflectors, {Pape, 1992 #40} are commercial product and can be used in practical systems.

We refer to "electro-optic deflectors" (or electro-optic deflection systems), as described in www.conoptics.com/electro-optic-deflection-systems/, as accessed Nov. 30, 2020, and commercialized by the same company, to describe devices able to shift angularly, or to focus, a light beam using the Electro-optic effect, in 1D, 2D or as a focusing mechanism. Multi-channel electro-optic modulators can also be developed Referring to "DMD or SLM" in this invention is a shorthand language of any device able to impose an amplitude, intensity, phase or polarization image—in the sense of varying distribution of the physical parameter stated, on a coherent or incoherent beam, in most case uniform, including also, for example, but not limited to, Acousto, Magneto—or Electro optic devices.

"Singular Optics", which includes "optical vortices" as its simplest example is today an emerging domain of optics, with theoretical as well as practical applications. Detailed description may be found in {Nye, 1974 #37; Soskin, 2001 #38} Nye, et al., both of which references are incorporated herein by reference.

A "Wavefront shaper" is a device able to modify dynamically the light distribution. Wavefront shaping in Microscopy had mainly use SLM positioned at the pupil of the optical system, and have been applied to controlling multiple light scattering in biological tissues, as in {Park, 2018 #41} or in {Ritsch-Marte, 2009 #39}. The same technology tools can be applied here to create simultaneously several light points, or more complex patterns.

We refer for singular distributions with radial symmetry to "doughnuts" and to the position of the zero of intensity of these distributions as the doughnut null or in the text of {Balzarotti, 2017 #4} cited in this invention, as zero or center, of the doughnut.

"Inelastic optical interaction" refers to interactions between light and matter creating photons which differ in wavelength from the incoming beam. Inelastic optical interaction includes, but are not limited to fluorescence, multiphoton interactions, and Raman scattering.

The "locus of a singular distribution" is the ensemble of Cartesian positions on which the intensity of the singular distribution is zero. The locus of a singular distribution defines a family of elementary shapes, which, with adequate parameters, the "nominal parameters" and positioned at the right position; the "nominal position" will not emit (or reflect or scatter) light. In this case we will coin the new concept and express that the "singular light distribution embeds the geometrical shape".

"Conical refraction" is an optical phenomenon predicted by Hamilton, (Hamilton 1831), and experimentally confirmed two months later by Lloyd, (Lloyd 1883). Both of the foregoing references are incorporated herein by reference. Conical refraction describes the propagation of a light beam in the direction of the optical axis of a biaxial crystal. Hamilton predicted that the light emerges in the form of a hollow cone of rays. Conical refraction is an important milestone in the history of science and has played a role in the demonstration of the theory of electromagnetic waves.

However, a discrepancy between Hamilton theory and Lloyd's preliminary experiments and more accurate measurements and observations was pointed out by Poggendorff, as early as 1898. This unexplained results puzzled scientists for more than 150 years and prevented the use of this powerful effect in practical systems.

A full theoretical analysis was provided by Sir Michael Berry, in Berry, (Berry 2004), which is incorporated herein by reference. Berry's also changed the name of the physical effect from "conical refraction" used by Sir Hamilton, to "conical diffraction" and we will use conical diffraction in this invention.

Berry's paper, and the availability of synthetic biaxial crystals, at high quality and reasonable price, paved the way to the use of conical diffraction as one of the most powerful tool in the optical engineering toolbox.

The inventor has been one of the leading scholars to understand the practical potency of this effect. He introduced the thin crystal concept, trading "all the beauty and elegance of Poggendorff rings and conical diffraction that you (Sir Michael Berry) developed for a dull but efficient controllable beam shaping unit"

A prior art system based on conical diffraction for super resolution microscopy is described in {Caron, 2014 #33; Sirat, 2016 #36} and incorporated here by reference.

In the present Description, the term "energy law" is defined as follows: Assuming that an object has been modeled as a mathematical abstraction, the geometrical shape, the "energy law" is the parametric relation between the energy, as a function of the shape parameters and the position. It creates a relationship quantifying the energy dependence of the parametric space. The energy law may include the energy distribution, emitted by a luminous object with a shape identical to the geometric shape.

In this invention, we assume in this description that the optical singular distributions can be controlled, in a way to switch from one type of distribution to another, from a predetermined family of distributions, and to modify the parameters of the optical singular distributions using external means, as described by Sirat in (Sirat 2016). Other solutions exist, not requiring the optical singular distributions to be controlled, and are indeed part of this invention, but they may be much more cumbersome, in the inventor opinion.

The "control means" will refer to a set of control hardware, able to modify the inputs and a "control algorithm", able to foresee next steps of input values required to quantify directly or by successive approximations the "energy law" in a way adequate for retrieving the parameters with precision. The "inverse energy law" is a recipe, optimal or not, able to retrieve the parameters of the position and/or the shape, from a set of measurements of a single singular distribution or of a set of singular distributions. It is embedded in the control algorithm. It will be chosen to optimize the functional parameters of the system, either the number of steps required, the overall energy—or power—impinging on the biological object, the speed of measurement, any combination of the above or any other functional parameters of the system.

Even in the simplest case of a single point, the energy law is dependent of the three Cartesian positions of the point. Some choices of illuminations, described below, in some domain, allow to decorrelate the dependence of the inverse energy law from two of the Cartesian positions, simplifying greatly the gathering of the information and improving the precision.

Additionally, many inverse energy laws are quadratic and loose the information of the sign of the position. A solution is proposed in the following.

Finally, the inverse energy law is based on some hypothesis, as for example that the object is a point, a line or a rod. Additional measurements, redundant and over-determined, can be used as a validation of the hypothesis.

For purposes of the present Description, it is assumed that a separate mechanism had been used to gather the nominal position of the object. Within the scope of the present invention, this mechanism may use any microscopy, as widefield, confocal or super-resolution technique, or any localization technique, such as PALM, STED, STORM, or from a-priori independent knowledge.

In the context of singular distributions, a "value close to zero" shall refer to energy used to qualitatively describe intensity projected or energy emitted which are much smaller than the maximum intensity available on the projected light or of the energy emitted if the maximum of the projected light is impinging on this point. A quantitative value for a close to zero intensity or energy is a factor of nine between the intensity projected and the maximum intensity of the distribution or between the energy emitted and the energy emitted if illuminated at maximum intensity. It is worth mentioning, that assuming Poisson noise, energy close to zero will have a noise value markedly smaller, above three times less, then at maximum energy. Likewise, a geometrical parameter value of shape, close to zero will have a value smaller than one third of the full range of the parameter.

"Conical Diffraction Microscopy" or "CODIM", refers to Conical diffraction Microscopy as described in {Sirat, 2016 #11} and {Caron, 2014 #33}

Prior Art: Microscopy

Referring now to FIG. 1, which shows an illustration of the paradigm of Microscopy, 100, in the field of Biology. Microscopy comprises the illumination, by a light source, not shown, using a microscope, 10, of a biological sample, 11, and the time-dependent measurement, using either visual observation or a detection module 12, of the light emitted by the sample.

The sample in Biology comprises a single—or a plurality—of different biological entities, 13 and 14, positioned at different positions. Examples of such objects are, among others, a cell, a virus, a protein, and a DNA fragment.

Fluorescence Microscopy

Fluorescence microscopy is one of the variants of microscopy, it has replaced in many biological applications, the other microscopy techniques. A fluorescence microscope is an optical microscope used to study properties of organic or inorganic substances using the phenomena of fluorescence instead of, or in addition to other modalities such as reflection and absorption.

In fluorescence microscopy, the sample is illuminated by light of wavelength, or specific wavelengths, which is absorbed by the fluorophore, thereby inducing the emission of light at different, higher, wavelengths.

The illumination light is separated from the emitted fluorescence, which is in most cases at higher wavelengths, by the use of a spectral emission filter, reducing markedly the background of the acquired images.

Even if fluorescence microscopy is the most common modality of its kind, many other microscope modalities, using an inelastic interaction, i.e. the sample, or an entity bounded to the sample, emitting light at a different wavelength than the light source, exist.

In this invention, whether we refer to fluorescent microscopy for readability and simplicity, the other inelastic interactions, including but not limited to Raman, two or multi-photons microscopy, are reputed part of this invention.

We refer again to FIG. 1, describing, at this time, a fluorescence microscope; in fluorescence microscopy fluorophores, tiny point sources, 15 to 18, based on the physical phenomenon of one photon fluorescence, are fixed at specific positions of predetermined biological objects, 13 and 14; the light emitted by the fluorophores is observed instead of observing the light emitted by the biological objects, 13 and 14, themselves.

Fluorophores have become an important tool for the visualization of biological objects. The activity and the biological information including details below 200 to 250 nm, the limit of diffraction, are systematically viewed and measured using fluorescence microscopy. This resolution limit is derived from the Rayleigh criterion, which in the best case, reaches 200 to 250 nm in systems designed specifically.

It has to be noted, that in fluorescence microscopy, the information collected and retrieved is a map of the fluorophores and not directly an image of the biological object, as pointed out by several authors, including Sirat-2016. The relation between the measurement and the object relies on hypothesis, which can, in most cases, be trustworthy.

The main implementations of fluorescence microscopy, as described in detail in the literature, are the confocal microscope, often used in a scanning configuration or spinning disc microscope, and the wide-field imaging microscope.

Referring now to FIG. 2 which is a simplified representation of a confocal fluorescence microscope of the prior art 200. A confocal fluorescence microscope, FIG. 2 is an optical instrument. Its main hardware components are shown in FIG. 2. They include:

a light source, 20,
an optomechanical frame not shown
a cube filter, 21,
a microscope objective 22, and,
a detector assembly, 23,
a processing unit, not shown.

The light source 20, which may be an arc lamp or a laser, creates light energy necessary for fluorescence. The Optomechanical frame, not shown, is the support of all the optical components and auxiliary optics and includes alignment capacities. It also includes optical elements, not shown, capable of shaping the beam to allow its focus point of a minimum size by means of the microscope objective. It can also comprise, in a confocal scanning fluorescence, a spatial or angular scanning mechanism, not shown, to change the position of the point source with respect to the object to be measured.

The scanning mechanism can alternatively:
mechanically translate the object, for example by using a translation plate,
optically scan the beam on the object, for example using a set of galvanometric mirrors or acousto-optic translators, or
use any combination of these translation means, mechanical or optical.

In a confocal scanning fluorescence, the information is collected point by point, using the scanning mechanism. It can also comprise, in a rotating disk type confocal fluorescence, a rotating disc having a plurality of pinholes, allowing the simultaneous projection of a plurality of points. In a confocal fluorescence rotating disk, a set of points, corresponding to the pinhole is acquired at any time and the rotation of the disk allows to scan the entire surface of the sample for a given longitudinal position.

The cube of filters, 21, channels the different optical signals and avoids contamination of the fluorescence signal by the emission. The cube is composed of filters: excitation filter, 210 dichroic mirror, 211, and emission filter 212. The filters and the dichroic mirror are selected according to the wavelength of excitation and emission spectral characteristics of the fluorophore.

The microscope objective 22 focuses the light created by the source in the focal plane of the lens 24, a light distribution pattern of small size, the optimum light distribution consisting of the Airy disk. The microscope objective 22, also collects back fluorescent light emitted by the fluorophores.

For a confocal scanning fluorescence, the system can be descanned, that is to say, the return light can pass through the scanning mechanism to compensate for the translation due to scanning.

A detector lens, 25, creates, in the image plane of the detector 26, a magnified image of the focal plane of the lens 24.

A confocal hole, not shown, is theoretically placed in the image plane of the detector 26. In most practical systems, the confocal hole is placed in an intermediate imaging plane, not shown, and reimaged onto the image plane of the detector 26

The assembly of the detector, 23, detects the fluorescent intensity in the overall illuminated volume, and converts it into digital signal. In the simplest implementation, for a confocal scanning microscope, the detector assembly comprises a detector of a single element, such as a PhotoMultiplier Tube PMT or Single Photon Avalanche Diode SPAD. For a confocal microscope using a rotary disc, the detector assembly is comprised of a matrix of detector elements, such as a Charged Coupled Device CCD, an Electron Multiplying CCD EMCCD, a common Metal Oxyde Semiconductor CMOS or a matrix of SPAD.

All components mounted from the light source to the dichroic filter is the illumination path, 201. The detection channel, 202, represents all the components mounted from the dichroic filter to the assembly of the detector.

Fluorescence microscopes are available from several manufacturers, such as Zeiss, Leica, Nikon, and Olympus. Fluorescence microscopes can be either standard microscopes suitable for fluorescence or microscopes optimized specifically for fluorescence. Modern microscopes are versatile instruments capable of operating in many different modalities, including, but not limited to, fluorescence modalities, using the same platform and most optomechanical components. Most fluorescence microscopes are developed as an open platform, capable of performing several additional features with minimal modifications. Other fluorescence microscopes are instruments dedicated, adapted for a specific task, such as medical diagnosis or pharmaceuticals.

Prior Art: Super-Resolution

For a long time, until the emergence of super resolution techniques described below, it was widely assumed that optical techniques, including fluorescence microscopy, are unable to visualize details smaller than the Rayleigh criterion, which is about 200-250 nm, for visible light.

However, other fundamental biological activities also occur at scales smaller than 200 nm in biological samples. At this level of spatial resolution, important phenomena can be observed: the biological processes at the scale of intracellular, cell information transfer, the folding and unfolding of the proteins and changes in the DNA and RNA. For example, the measurement of this intracellular information opens new avenues for understanding the biological activity, and lead to progress in understanding and monitoring of research and medical diagnostics.

"Super-resolution microscopy, in light microscopy, is a term that gathers several techniques, which allow images to be taken with a higher resolution than the one imposed by the diffraction limit." (contributors 2019). We use the definition found in Wikipedia, for STED, localization microscopy, PALM, STORM, and many other modalities, described for example in en.wikipedia.org/wiki/Super-resolution_microscopy, as accessed Nov. 30, 2020. We include also in super resolution, additional super resolution modalities known to the man of Art Conical Diffraction Microscopy is a super resolution modality, developed by the inventor (Sirat 2016), hereinafter, "Sirat 2016".

Several microscope modalities use a reconstruction process, i.e. the direct data retrieved physically by the detecting system is not the final result and an algorithmic step is required to retrieve the final image.

The positivity constraint, the physical fact that light intensity is intrinsically positive, adds a supplementary restriction on the mathematical solutions for optical systems in which an algorithm is used to calculate the final object (reconstruction). The positivity constraint can be applied on the general cases, limiting the field of possible solutions, and so improving someway the result quality. However, in a specific case, named by the inventor Abbe's loophole, and described below, this constraint allows to overcome the Abbe's limit of resolution, it is the case with this invention.

Imaging, Localization and Tracking

We refer, in this invention, separately to two different functionalities: imaging and localization, even if, in many cases, the two functionalities can be assessed on the same instrument.

In imaging we are observing an object, without implying any additional information, a priori, on this object. Localization assumes that the object is a point and can be parametrizes by a small number of descriptors. "Tracking" is a shorthand term to dynamic localization, or localization as function of time, and we will use either localization or tracking, depending on context.

In imaging, the observed object, which differs from the original object, can be described, in a degrees of freedom formalism, with a finite number of degrees of freedom, limited by the optics system (Lukosz 1966). The observed object is conceived as a filtered version of the original object, and is limited by diffraction, in the general case, even if some super resolution schemes can be applied.

In localization, the object is known, or is hypothesized, to be a single point; it is a parameter searching problem, which is quantified by Cramer-Rao criterion and is definitely not limited by the diffraction limit, but by the signal to noise ratio.

Between these two extremes, the total absence of a priori information, and the parametric description of the object, many cases exist, in which some partial information exists. As an example, the assumption that the scene consists of sparse objects allows some additional information on the object, which, in some cases, can be translated to additional information or resolution. In (Sirat 2017), for Abbe's loophole techniques described below, the inventor extended the localization problem of a single emitter to the case of a simple geometrical object retrieving both the position and the geometrical descriptors.

And Metrology

We refer to "Metrology" as a third modality, besides imaging and tracking, as a modality in which we acquire, besides the position of a single point, or a small set of single points, a set of descriptive geometrical parameters, describing the observed entities as simplified geometrical—or/and temporal—objects, as described in in (Sirat 2017) incorporated here in its entity. The inventor considers Metrology as a, new, additional modality of this invention, with practical impact as valuable as imaging and tracking.

Localization Alternate Paths

Globally, two strategies, which can be applied either for lateral or axial measurements, or conjointly for both, exist to determine the position of an object, assumed to be an emitting point of infinitely small size (refers below in short as an emitter), above the limit of diffraction:
  Projection strategy: Projecting a light distribution with infinitely small size and recording the returned energy
  Emission strategy: analyzing the returning light, under the assumption of an infinitely small size
The STED modality, described in en.wikipedia.org/wiki/STED_microscopy, as accessed Nov. 30, 2020, and in the cited references there, is the archetype of the Projection strategy of localization. By careful nonlinear engineering, the projected light is concentrated to a size smaller than the diffraction spot, theoretically unlimited, in the case of the projection of infinite energy. Both two-dimensional and three-dimensional solutions are described and implemented in real working systems The localization techniques, described in en.wikipedia.org/wiki/Super-resolution_microscopy#Localization_microscopy_SPDM, as accessed Nov. 30, 2020, including techniques named PALM and STORM are the archetype of the Emission strategy of localization. Assuming the emitter is a single point, the spot centroid, for two-dimensional localization, if the light distribution created on a detector is a single spot, can be retrieved through adequate algorithms; it is a measure of the position of the emitter. The position can be retrieved with infinite precision, assuming infinite energy.

More evolved techniques, mostly devoted to three-dimensional localization, shapes the emitted light, using adequate optical means, as (Pavani, Thompson et al. 2009) or (Fallet, Dubois et al. 2015) as examples, creates a more complex, and more accurate, relationship between the localization values and parameters of the shape of the light detected. We refer in this invention to these techniques as three-dimensional shaping of the emitted light. These techniques are able to measure the axial position of an emitter but require a minimal number of photons to do so.

We refer in this invention to "3D projected light shaping methods" to methods, characterized by the fact that the light projected by the emitter is shaped creating a predetermined shape, this shape being dependent of the axial position and means to retrieve the axial position from the shape. The concept of the 3D STED is one example of such methods: in CODIM, {Fallet, 2015 #15; Fallet, 2016 #35; Sirat, 2016 #11; Sirat, 2017 #8; Sirat, 2017 #12; Sirat, 2017 #31; Sirat, 2016 #36; Sirat, 2017 #34} describe several means to shape the projected light to make it axially dependent.

We refer in this invention to "3D emitting light shaping methods" to methods, characterized by the fact that the light emitted by the emitter is shaped by an additional optical module creating a predetermined shape, this shape being dependent of the axial position and means to retrieve the axial position from the shape. A review of some of these techniques can also be found in (Martens, Jabermoradi et al. 2020).

BRIEF DESCRIPTION OF THE DRAWINGS

The foregoing features of the invention will be more readily understood by reference to the following detailed description, taken with reference to the accompanying drawings, in which:

FIG. 5 describes a simplified algorithm and process to retrieve the two- or three-dimensional position of an emitter.

FIGS. 5C-5E represent 3 cuts of the light distributions, at different axial positions, represented as FIG. 5C, FIG. 5D and FIG. 5E, namely, (1) at focus, (2) at an axial position of 0.1 Rayleigh range, and (3) at an axial position of 0.2 Rayleigh range.

SUMMARY OF EMBODIMENTS

Figure 1:
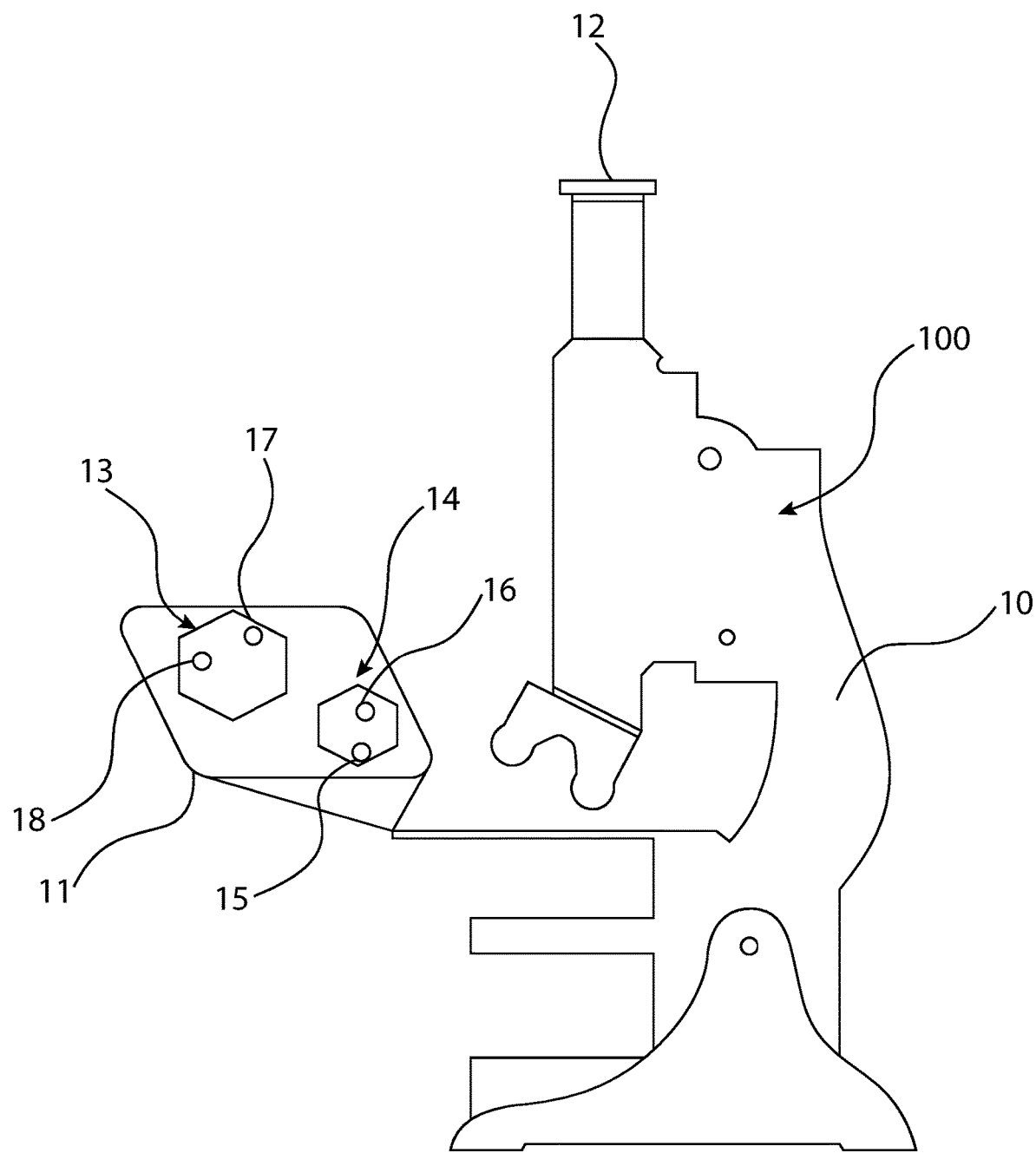
FIGS. 1 and 2 reproduced from Sirat-2016 are simplified representations of a fluorescence.
Figure 2:
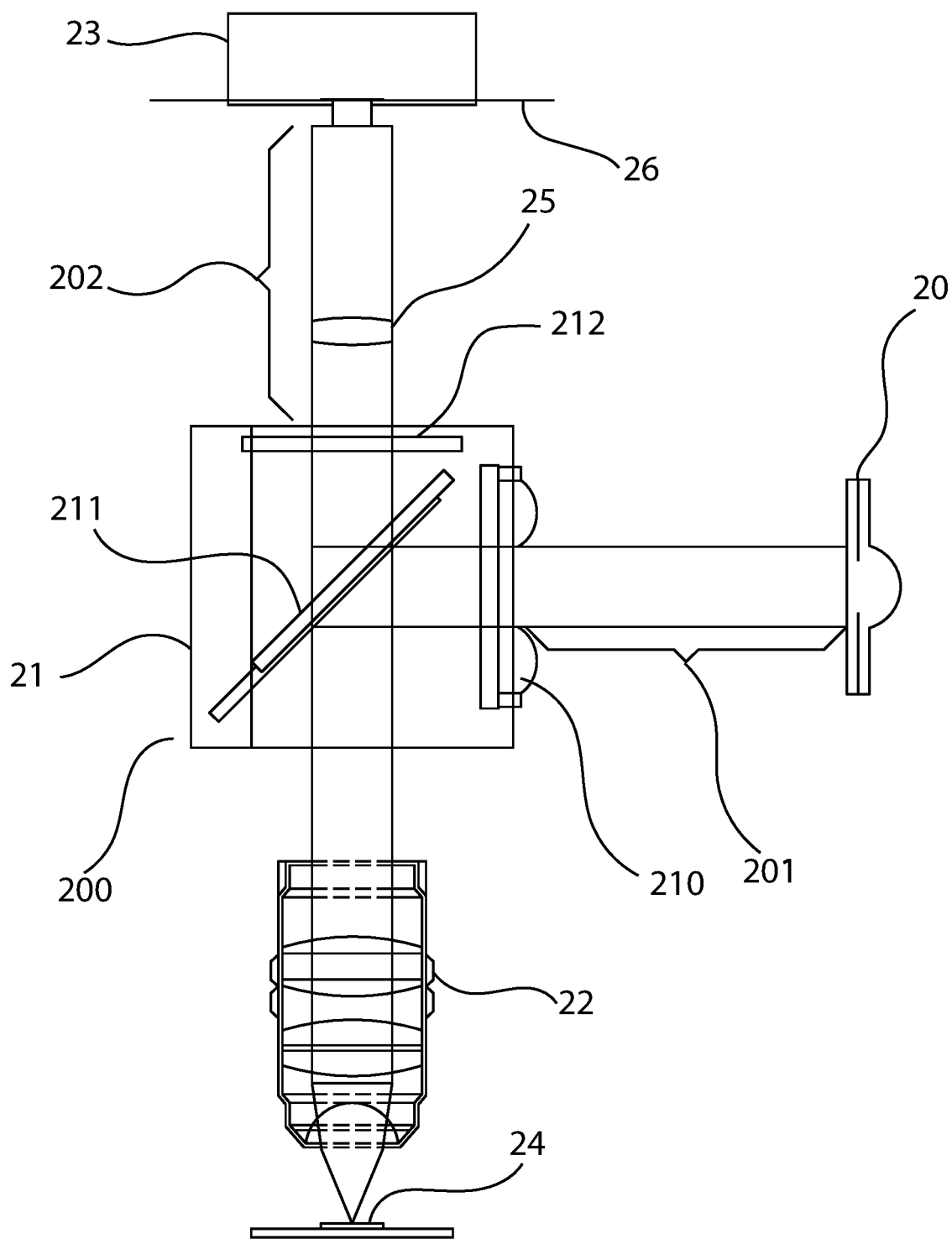

In one embodiment, the present invention provides a method for determining a position in three dimensions of a light-emitting object in a sample. In this embodiment, the method includes:

characterizing two of the dimensions of the position in a first coordinate system using an Abbe's loophole technique, by projecting along a first projection axis, onto a part of the sample including the light-emitting object, a first set of distributions of optical radiation having zero intensity at a common center of each of the distributions of the set, measuring the intensity of the light emitted and moving the set of distributions to a first location on the object wherein the light emissions are at a minimum, such location characterizing such two of the dimensions; and using an optical module to shape the light emitted from the object, before detecting the light, in a manner wherein a resulting shape depends on an axial position of the object, recording the shape and the overall intensity, and using the resulting shape measurement to determine the axial position.

In a related embodiment, the invention further includes determining the position of the light-emitting object, with even higher accuracy, by characterizing all three of the dimensions of the position in a second coordinate system using the Abbe's loophole technique, by projecting along a second projection axis onto the object a second set of distributions of optical radiation having zero intensity at the three-dimensional position of each of the distributions of the set, determined according to claim 1, and moving the set of distributions to a second location on the object wherein the light emissions are at a minimum, such second location characterizing all three dimensions. Optionally, the method further includes, before characterizing two of the dimensions of the position in the first coordinate system, acquiring a rough estimation of the position of two- or three-dimensional position of the light-emitting object, by standard localization or imaging methods. In a further related embodiment, the invention further includes, in the course of projecting a set distributions selected from the group consisting of the first set and second set of distributions and combinations thereof, onto the light-emitting object, measuring the intensity of light emitted along a selected Cartesian axis in a delimited region thereof including a location having minimum intensity, wherein such intensity along such Cartesian axis yields a measure of the position of the light-emitting object along such Cartesian axis, decorrelated from position of the light-emitting object along other axes. In a further related embodiment, the set of distributions includes at least two distributions. In a further related embodiment, the set of distributions of optical radiation having zero intensity at a common center of each of the distributions of the set, is chosen such that the set of values measured from the intensities and shapes is selected from the group consisting of redundant and over determined, in order to provide validation of the determined position.

In another embodiment, the invention provides a method for determining a position in two or three dimensions of a set of separated light-emitting objects. In this embodiment, the method includes characterizing two or three of the dimensions of the position of each one of the separated light emitting objects, by projecting, using a scanning device, along a projection axis, onto each object of the set of objects, a set of distributions of optical radiation having zero intensity at a common center, in two or three dimensions, of each of the distributions of the set of distributions, the center being different for each object of the set of objects, measuring the intensity of the light emitted and moving the center of set of distributions, by using a scanning device, separately for each object of the set of objects, to a location on the object of the set of objects, wherein the light emissions are at a minimum. Optionally, the scanning device used to move the positions of the is a SLM or a DMD, positioned at a plane conjugate to the sample, and the scanning device is operating, for a SLM or a DMD, in a mode that either only pixels conjugated to the position of the determined positions are in ON mode and the light collected is the direct path, or, alternatively, in a DMD, only pixels conjugated to the position of the emitters are in OFF mode and the light collected is the indirect path. In a related embodiment, the size of the spot corresponding to the diffraction limit is larger than the pixel size, by a factor between 3 and 11. In further related embodiment, an algorithm is applied to determine an adequate combination of pixels ON and OFF, to position the centroid of the spot on the sample with resolution better than a single, full, pixel of the scanning device, projected on the sample plane. In yet a further related embodiment, a first optical module is used to create a light distribution including the emitters position as part of the illumination domain. Optionally, the scanning module is selected from the group consisting of a multi-channel acousto- or electro-optic deflector and a Wavefront shaper, and combinations thereof.

DETAILED DESCRIPTION OF EMBODIMENTS

Abbe's Loophole

We refer to Abbe's Loophole, a term coined by the inventor, in previous patent applications and publications, to describe a family of projection techniques in which the localization of an emitter is derived from the absence of light created by the projection of an optical pattern, including in an approximate center a null of energy on the emitter, assumed to be of infinitely small size.

The rationale of this formulation is that Abbe's law precludes direct measurements of spatial frequency components above the diffraction limit; however, the positivity constraint creates an additional underlying relationship between all frequency components. In the specific case when all frequency components, below the diffraction limit and the spatial DC component are all zero (black image) this constraint requires that all frequency components above the diffraction limit will be also zero. In this loophole, the frequency components, both below and above the diffraction limit are known—to be zero and this indirect measurement of all frequency components is a practical breach of the diffraction limit.

We use, in this invention, the nickname "white system" for describing a localization system based on the emission strategy described above and "black system" to describe a localization system based on the Abbe's loophole.

One family of techniques based on Abbe's loophole, uses a vortex, or another similar distribution with a zero intensity precisely or approximately at the center, as the light distribution projected on the sample. This technique had been proposed in (Sirat 2017), a divisional patent of (Sirat 2016), with priority date of October 2010, using the name of "black fluorophore". This technique is also described in (Hell 2016), with priority date of November 2011, and later in several papers as (Balzarotti, Eilers et al. 2017, Gwosch, Pape et al. 2019) published and commercialized under the name of MINFLUX.

The extension to a three-dimensional case, with appropriate three-dimensional distributions, can be found in the cited references.

A different, and complementary technique, for which the inventor coined the name, in publications, as "dark tracking", uses a plurality of light distributions, with similar radial functionality and common central zero, but different azimuthal dependences, projected on the sample sequentially (Sirat 2016, Sirat 2017). This technique had been proposed in (Sirat 2017), a divisional patent of (Sirat 2016), with priority date of October 2010.

The differentiation of these two techniques, lies in the acquisition, in dark tracking, with the same photon count, of the azimuthal angle in addition to the radial information, the only information available in the "black fluorophore"/MINFLUX technique. This additional information simplifies much the ability to reach the position whether the zero—in this case of the aggregate of the distributions—is positioned on the emitter.

A derived technique, referred by inventor as "Metrology" in (Sirat 2017) generalized the "dark tracking" technique to emitter consisting of simple geometrical objects, as point-objects and line-objects defined above, and not on infinitely small points, in order to retrieve both the position and geometrical descriptors of the emitter shape.

We refer in this invention to "dark addressing" to describe a technique which allows to perform dark tracking simultaneously—or quasi simultaneously—on several identified targets as described in the following.

These techniques allow additional resolution, theoretically unlimited, by combining
  a loophole of Abbe's law
    the almost total absence of noise, in the specific case described as the Abbe's loophole, due to Poisson's law
  an anomaly in Cramer-Rao bound, close to zero intensity.

To get the best performances from these techniques, the absence of any spurious photon, is expected, in order to fulfill the theoretical conditions and to reach the optimal, unlimited resolution. The absence of spurious photon condition or at least its minimization, is more easily met using inelastic light interactions, as fluorescence, multiphoton interactions and Raman scattering; in these modalities, the incoming beam can be totally filtered by spectral means, without (almost) sparing a single photon.

All other optical techniques can also make use of these principles even if background photons will limit the ultimate resolution achievable and are part of this invention.

To be more precise, the techniques described above as Abbe's loophole techniques can be structured as involving three steps: a detection step, an intermediate step (to position the doughnut null or the dark tracking combined zero, close up to several nm or below 20 nm, to the emitter, this step nicknamed "daemon step") and a precision step.

The earliest description of what we refer to as the daemon step had been stated in Sirat 2010. However, we follow the later description in (Balzarotti, Eilers et al. 2017), referred as Balzarotti-2017, cited in extenso, due to its didactic and self-explanatory redaction, to describe the techniques we refer to as Abbe's loophole solutions in this invention and their limits:

Let us now perform a gedanken experiment in which we seek to establish the trajectory of a molecule diffusing in space. Instead of using uniform widefield excitation and a camera, we now excite with a reasonably bright focal doughnut that can be moved rapidly throughout the focal plane. If we, or a demon, now managed to target the zero of the doughnut shaped excitation beam exactly at the molecule, steering it so that it is constantly overlapped with the molecule in space, the doughnut-targeting device would map the molecule in perfection without eliciting a single emission. On the other hand, a single emission (e.g. due to a minimal misplacement) would be enough to know that the molecule is not at the location of the doughnut zero. Unfortunately, we cannot know the position of the molecule in advance and place the doughnut to that coordinate in a single shot, which is why perfect localization without emissions will remain the privilege of the demon. Yet, this gedanken experiment suggests that multiple shot probing of the position of a molecule with an intensity zero should reduce the emissions required for localization. This is because, in our picture, the fluorescence emissions are the price to be paid for not knowing the position, and the closer the zero gets in the course of probing, the lower will be the price. As a matter of fact, the emissions are highly valuable because, apart from confirming the presence of the molecule, they convey information about its distance to the probing zero.

In this application we refer to an Abbe's loophole technique, or a black technique, as a technique, using a doughnut or a combination or a sequence of distributions, in two or three dimensions, specific in the fact that a zero of intensity, or an intensity close to zero, exists at the combined center of the distributions, in one, two or three dimensions, is projected on the sample containing the emitter and that the doughnut null is moved towards the emitter to reach a position in which the emitter does not emit light.

Figure 3:
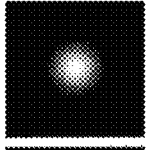
FIG. 3 represents the different singular distributions available using conical diffraction for projected light.
Figure 3:
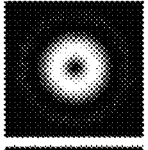
Figure 3:
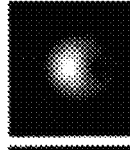
Figure 3:
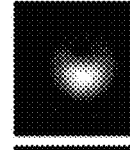
Figure 3:
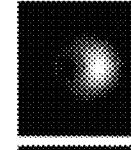
Figure 3:
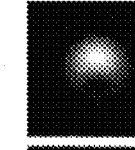
Figure 3:
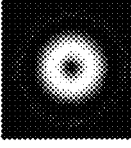
Figure 3:
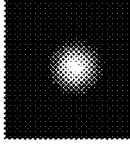
Figure 3:
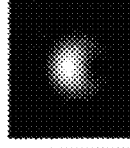
Figure 3:
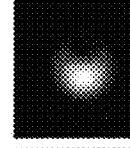
Figure 3:
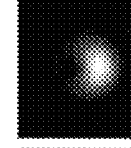
Figure 3:
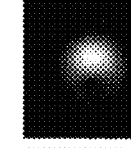
Figure 3:
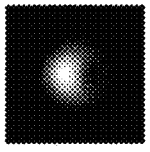
Figure 3:
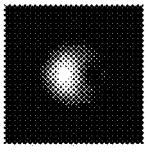
Figure 3:
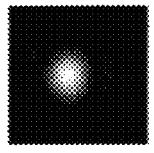
Figure 3:
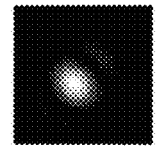
Figure 3:
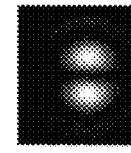
Figure 3:
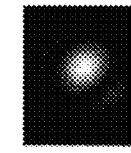
Figure 3:
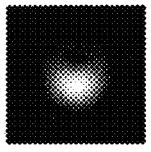
Figure 3:
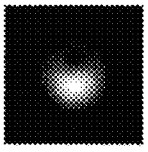
Figure 3:
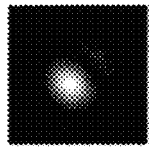
Figure 3:
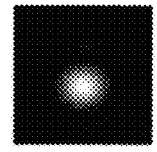
Figure 3:
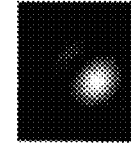
Figure 3:
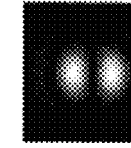
Figure 3:
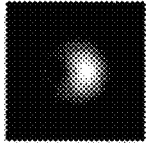
Figure 3:
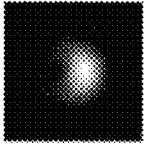
Figure 3:
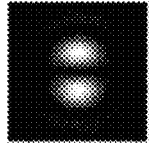
Figure 3:
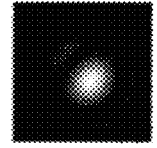
Figure 3:
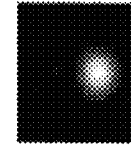
Figure 3:
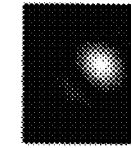
Figure 3:
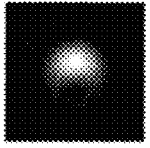
Figure 3:
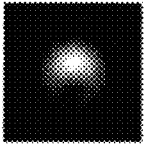
Figure 3:
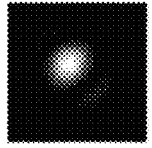
Figure 3:
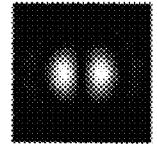
Figure 3:
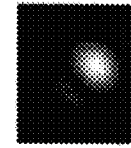
Figure 3:
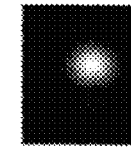

A two-dimensional Abbe's loophole technique can use a doughnut or a combination of distributions, as the conical diffraction distributions represented in FIG. 3, projected sequentially or concurrently, on the sample, whether a three-dimensional Abbe's loophole technique will add a distribution which is zero at the axial position of an emitter, Some embodiments of the Abbe's loophole techniques include also means to control the system and to modify the relative position of the null and the emitter In short, we are able to reach almost infinite theoretical resolution, whether the distance between the molecule and the doughnut null, is of the order of a few nms, with minimal photon cost; however, at the starting point the null can be separated from the molecule by a distance of the order of more than 100 nm. The intermediate steps nicknamed "daemon step", which in many cases are subsequent sets of measurements, are not in the low photon regime and has to be engineered carefully.

The starting point, the detection of the presence of the emitter, and its unicity, is used in many cases and uses relatively standard techniques; it allows reaching diffraction limit precision, (200-250 nm), or with some additional developments 90-100 nm precision, as obtained by super resolution systems exemplified by the super resolution systems developed by the inventor, using (Sirat 2016); its photon and system complexity cost can be lowered by reducing the precision requirements, but with the obvious additional burden on the second step, the intermediate daemon step.

The last step, whether the doughnut null is positioned at the molecule or very close to it, reach a few nms precision, is surprisingly, quite simple on conceptual grounds. It is the step in which (theoretically) a single photon will carry a YES/NO information.

This controversial statement, on the inherent simplicity of the last step, is accurate only on the conceptual level. Still, the system requires carefully engineered optics, single photon detection, motion control to the nanometer level and low noise electronics. These technical specifications are required to avoid creation of any spurious photon, electron, or digital count and to control motion. Nevertheless, all these requirements are in the realm of existing, well-entrenched systems and technologies, even if the combination of all these extremes specifications is utterly challenging.

The really challenging step, on both conceptual and practical ground is the intermediate (daemon) step, to bridge between the starting point of 100 nm precision and the few nms of the last step, in a deterministic reliable procedure and at a reasonable photon and system complexity cost.

Another point to be noticed, which make the Abbe's Loophole techniques intrinsically superior to other techniques, is the fact that, in many biological situations, the point of interest will remain static, or following a predictable path, for a long time. A sudden, unscheduled, event will modify the dynamic of the point of interest. These events may be the trigger of a major incident, as for example, an apoptosis or necrosis incident.

The cost, in photons, of the waiting time is, in Abbe's loophole techniques theoretically zero and the waiting can last for a long time. An event will trigger a burst of photons, which will be immediately recognizable, and will be the trigger for detection of the event. All white techniques will require checking the position of the point repeatably, with a sizeable photon cost for each interrogation.

Another point to be noticed, which make the Abbe's Loophole techniques intrinsically superior to other techniques, is the fact that, assuming the system is well-designed and able to reach speed above the typical speed of movement of the particle, after the system lock on the target, using purposely a language reminiscent of antiaircraft jargon, the cost in photons to track the particle can be reduced by proper observation and control.

A major issue, which will be even more important in the next paragraph, is to identify the molecule: in fluorescence, as well-known to the man skilled in art, two main mechanisms of recognition of a specific fluorophore is the emission/projection wavelengths specificities, which lead to multiwavelength systems and the Life Time characteristics, which may also be a tool to differentiate fluorophores.

The measurement of the lifetime of the incoming photons is possible, whether photons are available . . . . It is of major importance in the daemon step, and also in precise step in order to recognize if the incoming photon is created by the observed target or by a spurious fluorescence, a ghost image, a nearby object or any other parasitic light.

Finally, the presence of the target may require to be assessed from time to time and the responsivity of the target to light, the amount of light available for a given projected power is required by some, but not all, algorithms. The availability, in Conical Diffraction based implementations, of distribution similar to a gaussian beam, or an Airy shape, of controllable amplitude, is of important impact on the practicability of real-world systems and is part of this invention.

Description of Embodiments of the Present Invention: Hybrid Solution

A new method is presented herein, in which the measurement procedure is a separate, dedicated procedure and architecture, initialized in some cases by an imaging procedure.

The invention described below is directed towards accurately localizing an emitter, with precision above the diffraction limit of light employed in their measurement, with minimal flux.

This invention is especially adapted to accurately localizing features using inelastic light interaction, as, but not limited to, fluorescence or Raman scattering, in which the emerging light can be separated by simple means from the incoming light but can be applied as well to other microscopy modalities.

Methods in accordance with embodiments of the present invention may advantageously provide for measurement entailing resolutions greater than the diffraction limit imposed by the optics and minimal photon fluxes.

This method can be used as either an alternative to the Abbe's loophole three-dimensional techniques, whether the three-dimensional required resolution is in the ten nanometers range or, alternatively to simplify the "daemon step" and reduce its photon cost.

We refer to this new method as the "hybrid method". It is described below, and uses localization in two or three dimensions, based on analysis of the emitted light, in the intermediate step in order to measure the position of the emitter. The hybrid method can be used for two-dimensional localization, but the preferred embodiment is to record three-dimensional position of the emitter using the photons emitted anyway.

This technique is named hybrid, because it is combining, in the preferred embodiment, in a dedicated methodology, projection and emission strategies of localization, namely the use of projection strategy to acquire the two-dimensional lateral position, and emission strategy, through three-dimensional shaping to acquire the axial position.

The use of a three-dimensional shaping of the emitted light, as the tool to retrieve the axial position, with a reasonable precision of the order of 10 to 30 nms, using three-dimensional beam-shaping is a good solution, taking advantage of physical existing data and information readily available, if properly engineered. The three-dimensional shaping of the emitted light uses photons created, anyway, by the two-dimensional doughnut, used to retrieve the lateral position using a projection strategy. These photons exist anyway, because the emitting point is still not close to the doughnut null. It reduces markedly the cost in photons and increase the speed of reaching the doughnut null.

Additionally, the three-dimensional information is the most expensive to acquire, in term of photons and system complexity. It requires the three-dimensional equivalent to a doughnut which indeed exists but is far less efficient then the two-dimensional doughnut, due to fundamental principles. It also requires an approach of reaching the three-dimensional position of the emitter by acquisition in the three-dimensional space of many different positions.

In Abbe's loophole techniques, the addition of a three-dimensional requirement, complexify markedly the system; the demon has to be very clever!! A change of energy can be due to a movement in any of the three cartesian directions or any combinations of them. To retrieve the direction in space in which to move the null of the doughnut—or of an equivalent set of distributions—requires many measurements, which translate to a heavy photon budget.

The aim of this invention, whether used as an intermediate step in an Abbe's loophole technique, is to avoid daemon burn-out. We simplify his task by acquiring independently an axial information, by different means; the axial information retrieval is based on photons already created in the process by the projection strategy of localization used for the lateral dimension's localization. This independent information is acquired using an emission strategy of localization, complementary of the projection strategy of localization, based on Abbe's loophole, used for localization of the lateral dimensions In conclusion, this invention proposes a novel, unheard before, solution, by using a hybrid system, which consists of a specific, efficient, use of the information available, in a way not proposed before.

In another configuration, the invention consists of three subsequent steps:

DETECTION STEP: In the detection step the detection of the existence of the emitter, its unicity and a preliminary three-dimensional position of the emitter is obtained. Many different techniques can be used for the detection step, including but not limited to confocal and widefield Microscopy. The position may also be known from another a priori or external knowledge. The choice of the technique will be partially dictated by a low photon requirement.

DAEMON STEP: Acquiring the three-dimensional position of the emitter, through the hybrid method, described in this invention, PRECISION STEP: Acquiring the three-dimensional position of the emitter, consisting of the acquisition of the three-dimensional position using one of the three-dimensional Abbe's loophole techniques, as described in this invention, including moving the null of the distribution towards the particle, with highest possible precision of a few nms.

Description of Embodiments of the Present Invention: Multiple Synchronized Points The previous discussion, following (Hell 2016, Sirat 2016, Balzarotti, Eilers et al. 2017), presented the concept of measurement of the position of a single point, in one-, two or three-dimensions, potentially with several wavelengths, with high accuracy, high speed and low photobleaching and/or phototoxicity. However, many different biological mechanisms rely on synchronized elementary events, and the capacity, to acquire, SIMULTANEOUSLY (or quasi-simultaneously), several targets, separated optically, by a distance above the system ruler or a few system ruler, can be of major impact on the Biology and Medical fields.

With no need to give detailed examples, many biological functional events are complex, and are the result of signal trafficking and on subtle balances between several enabling and disabling signals and the dynamic of these signals is of paramount importance.

In this invention we differentiate and define, in super resolution Microscopy, in Microscopy in general, and generally in target high resolution following, a new paradigm: the multi-target follower scenario and adjust it to all black systems, even if the same scenario can be also applied to white systems and is reputed part of this invention.

The multi-target follower scenario is defined as the simultaneous—or quasi-simultaneous—measurement of a limited number of small target, as points, points-objects, lines, lines objects or simple geometrical small structures.

The additional complexity of this scenario is fully counterbalanced by the importance, in Biology of this specific case. Both confocal and widefield geometries are simpler indeed, easier to implement, but the performances gap is huge, in comparison to the development effort of this scenario dedicated and optimized to the multiple synchronized points.

The inventor state again that such a measurement system will have major impact of the capacity to measure, visualize and quantify the root causes of functional Biology activities, these root causes may be in the form of elemental molecular events; it is of paramount importance and worth developing a dedicated optimized solution.

The inventor state also that this scenario is well adapted, and complementary to two concepts introduced in his last invention, {Sirat, 2017 #12}, referred to here in its entity, which introduced a metrology and a deep learning schemes. The metrological features introduced there are different information, well-suited to the goal of correlating elemental events to functional information and the deep learning capacity is an additional tool to extract meaningful information.

Using again the antiaircraft jargon, the multi-target follower scenario simulates a synchronized attack of several planes and missiles, of different characteristics, speed, and lethality, whether the single target case concentrate on a single specific plane.

The solutions presented by (Hell 2016, Sirat 2016, Balzarotti, Eilers et al. 2017) are built on a confocal configuration, a single point (and target) and on a scanning system. To duplicate the point, and the point following technique, is cumbersome and will require an overly complex system—but not impractical unlike stated in (Gu, Li et al. 2019).

Other solutions based on widefield configurations as SIMFLUX, (Cnossen, Hinsdale et al. 2019), ModLoc, (Jouchet, Cabriel et al. 2020), SIMPLE (Reymond, Ziegler et al. 2019) and ROSE, (Gu, Li et al. 2019), lack the advantages of Abbe's loophole techniques.

In other words, the two existing simplified conceptual geometries describing the light dimensionality and dynamic projected on the object, namely confocal and widefield, are not fitted to the problem and challenge described here, which is specifically the tracking and identification of multiple but a small number, independent, targets. Due to the choice of a unoptimized configuration, all previous art solutions will require some compromise, either by giving up performances, or requiring a huge technological cost; mainly the confocal solutions may give up the simultaneity, whether the widefield solutions are projecting light everywhere, polluting the signals.

Figure 4A:
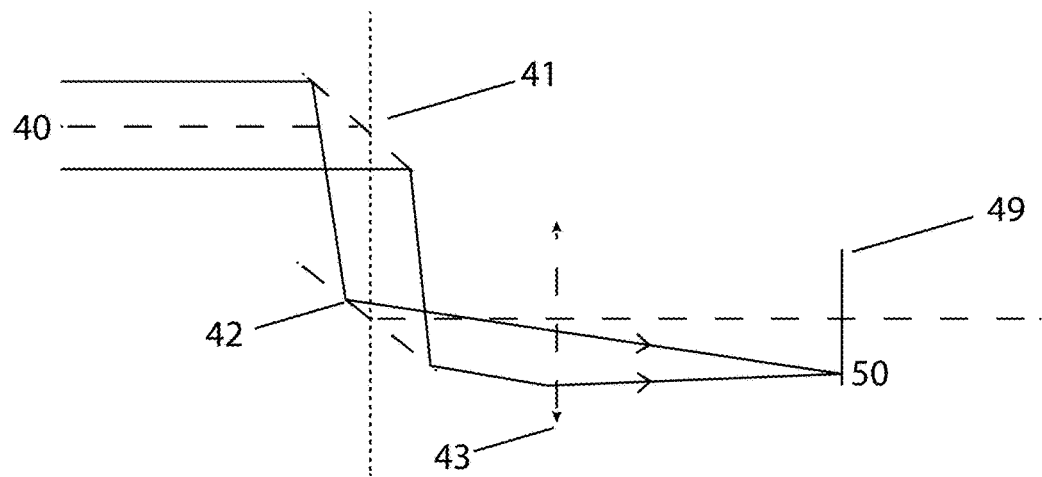
FIG. 4A describes the use of galvanometric mirrors, assumed, as it is common in confocal system to be a pair of orthogonal controlled mirrors.

To specify a new geometry of light interaction, we reconsider the elementary point formation process, FIG. 4A. Assuming a uniform beam of light, [40], the straightforward solution to create a single point [50], is, obviously, to focus the beam using a lens or an the optical system, [43], and to use mechanical means—as galvanometric mirrors [41] and [42] to move the point, [50], on the object plane, [49]. FIG. 4A is the underlying configuration used in a confocal system. The point position can be controlled using a scanning mechanism, such as a galvanometer mirror, as in FIG. 4A, or using an acousto-optic deflector, FIG. 4B.

Figure 4B:
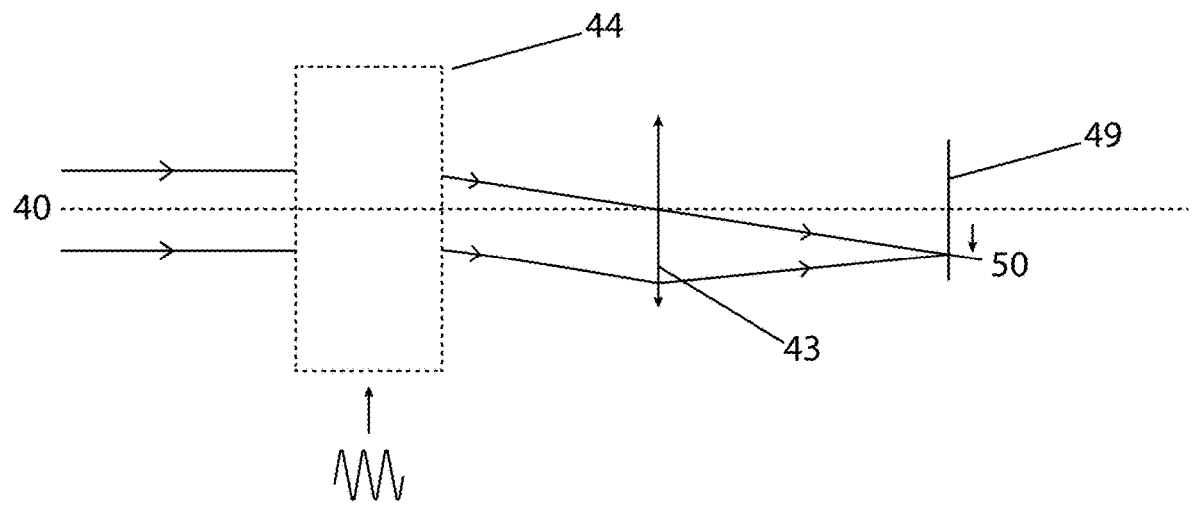
FIG. 4B describes the use of an acousto-optic deflector, FIG. 4C describes the use of a SLM or a DMD, FIG. 4D describes a different use of a SLM or a DMD, and FIG. 4E describes another different use of a SLM or a DMD.

In FIG. 4B, a uniform beam of light, [40], is deflected using an acousto-optic deflector, [44], focused using a lens or an the optical system, [43], to create a single point [50] on the object plane, [49].

Figure 4C:
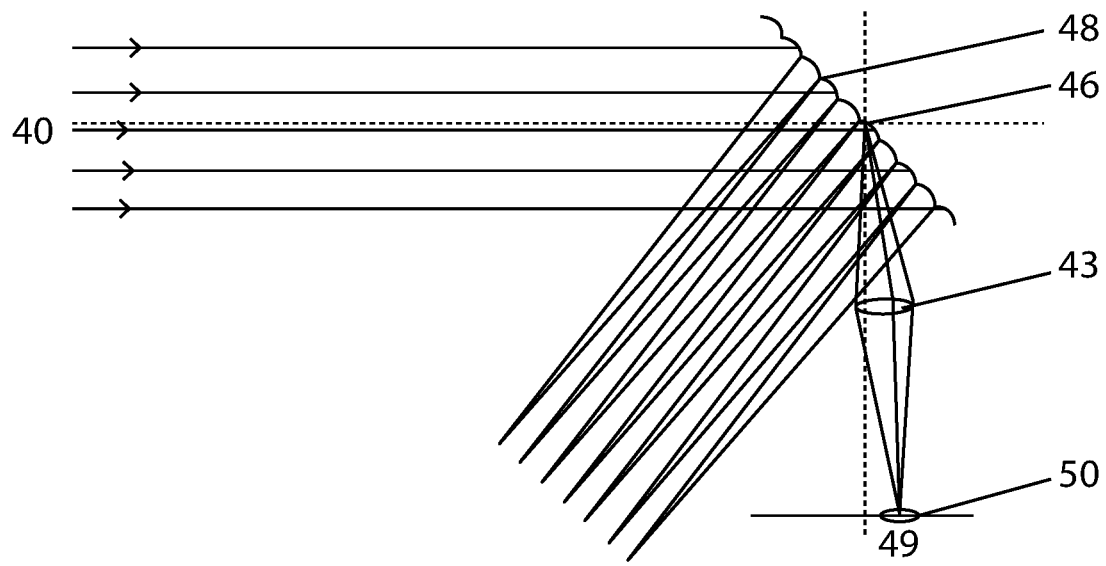
FIG. 4 represents four alternatives to create a single point from an incoming beam of light, assumed, but not required, to be a parallel beam at the entrance of the device.

A different solution, FIG. 4C exists: a uniform beam of light, [40], is projected on a controllable DMD or SLM, [48], represented as a reflective DMD device, even if transmission, similar, solutions exist. The DMD is positioned at the imaging plane of a lens or an the optical system, [43]; assuming all the pixels are switched off, except a single one, [46], as in FIG. 4C, or a small region which geometrical extent is smaller than the diffraction limit, consisting of a number of adjacent pixels, [47], FIG. 4D, a single point [50], will appear on the object plane, [49]; the point position is dependent on the single pixel position, in in FIG. 4C, or of the centroid of the region illuminated on the DMD or SLM in in FIG. 4D. Additionally, we assume, in FIG. 4D, in the case of a small region, that the light emerging from the pixel, reflected—or transferred, is coherent and that no additional phase delay occur between adjacent pixels, even if other cases may be also considered with a loss of performances.

The solution described in in FIG. 4C exists but in normal conditions, is considered as a poor alternative, with many drawbacks, to standard solutions, as the ones presented in in FIG. 4A and in FIG. 4B. The reason that this solution is seldom used is that, for a single point, the energy efficiency of such a solution is tremendously low, making such a solution almost unpractical. Indeed, all the light impinging on the OFF pixels is simply lost. To put numbers, assuming that the region scanned by the system is of 10*10 µm on the sample, and for a 250 nm diffraction limit, the energy loss is of the order of, roughly speaking, 1:1600, not taking into account additional geometrical losses.

Additionally, such a solution, if a single ON pixel is used, will allow positioning the point at discrete positions, corresponding to full pixels, and so will clearly not be adapted to Abbe's loophole systems, which require nms movement of the point. As explained below, the use of a small region, smaller than the diffraction size in the entrance plane, allows first a refinement of the movement step, because the pixel is smaller than the diffraction limit per design, but also sub-pixel steps, by carefully engineering the ON/OFF individual pixel characteristics.

The natural way to configure direct imaging is to adjust the pixel size to the diffraction spot, as in in FIG. 4C. This direct imaging scheme is described for example of a DMD or SLM as for example in (Gauthier, Lenton et al. 2016).

Figure 4D:
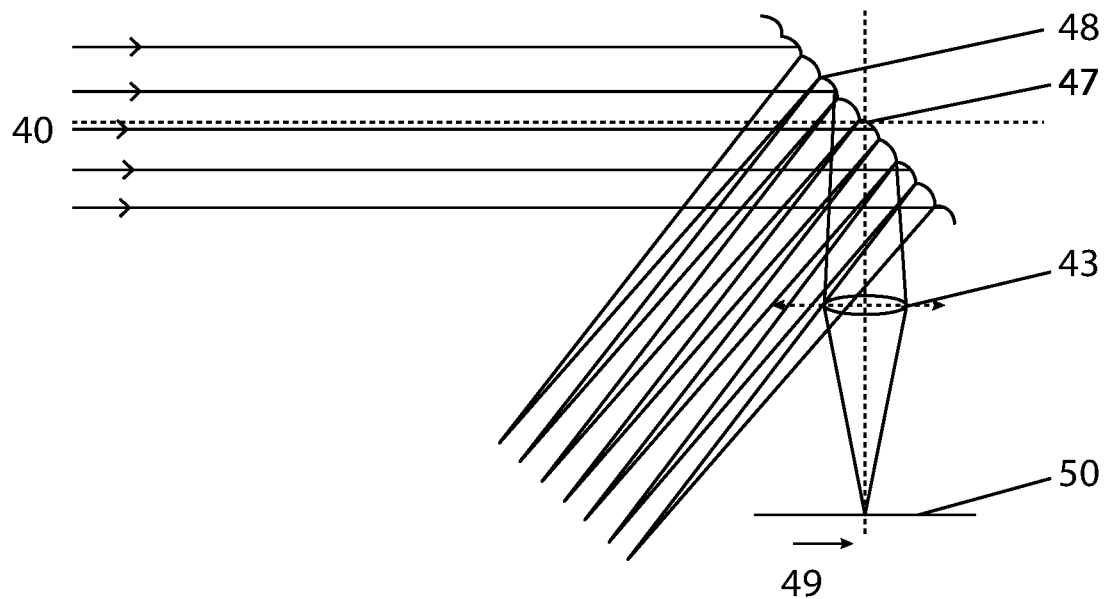

We introduce a new scheme to use Direct imaging of a DMD or SLM, in FIG. 4D: we will configure the dimensions of the DMD such that the size of a diffraction limit spot is much smaller—typically 1:5 to 1:11—referred to ratio 1:α, of the diffraction size. To create a spot centered on a specific pixel, positioned at $x_m$, $y_m$, assuming the light adds coherently, we can switch ON all the pixels in a region of size a, or any subregion, contained in it. Any more complex combination of ON pixels, in the region mentioned, will creates spot, almost similar to an Airy, positioned at a predetermined fraction of a pixel, allowing to address almost any position on the sample. Even more, departure from the subregion size, to get even more degrees of freedom, will simply slightly modify the shape of the spot, with controllable and quantifiable differences, which can be considered in the system algorithm.

Such a configuration provides a twofold purpose: on one side it reduces markedly the light loss, at the expense of the field of view on the other side we are able to position the point with accuracy better than the pixel size.

The configuration described in FIG. 4D, requires high tolerances of the positioning of adjacent mirrors, in a DMD, or, of the phase of adjacent pixels, in a SLM, to asserts that the different beamlets impinging on adjacent pixels will add coherently and create a single point. However, the actual existing technologies are able to fulfill such requirements.

In this scheme, the spatial bandwidth, in the sense of the size of the region which can be addressed by the system is traded for a direct positioning of the spot at almost any position, with a simple mathematical recipe.

In the specific case of Biology, the technological development had made such a tradeoff practical. Assuming
The diffraction limit to be 200 µm
the availability of a 1920*1024 DMD or SLM
α of 7
The measured region will span a region of 55*30 µm; this values are adapted to single cells, typically 25-40 µm size.

Additionally, in such a configuration, several independent points can be illuminated simultaneously, and controlled in parallel.

Figure 4E:
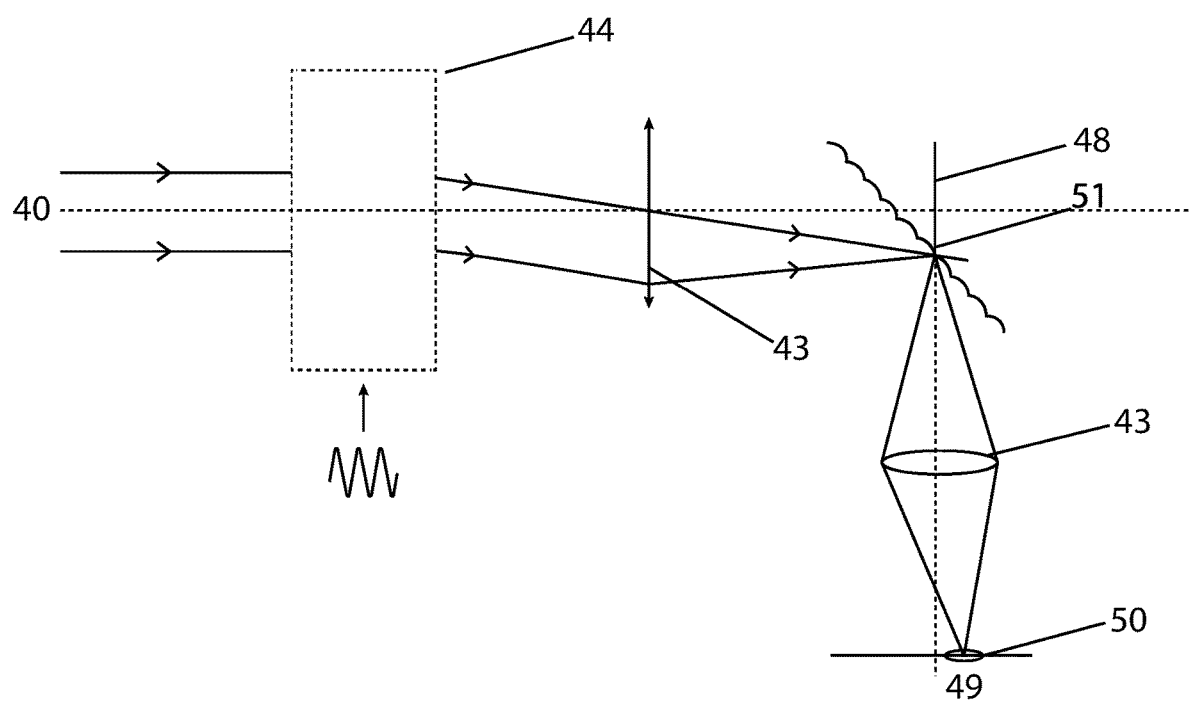

This solution can be improved, as described in FIG. 4E, in order to mitigate the energy loss, on one side, and to be able to move the point in fraction of the element size on the other side.

Assuming a lower resolution system, based on a galvanometric scanner, FIG. 4a, or preferably on an Acousto-optic deflector, FIG. 4B, multichannel Acousto- or electro-optic deflector, or a wave shaping DMD or SLM, positioned at the pupil of the system, as drawn in FIG. 4E, creating on the DMD or SLM, [48], a point larger than the diffraction limit. Let assumes that all the pixels are switched off, except a single one, in a configuration similar to FIG. 4C, not drawn, or a small region consisting of a number of adjacent pixels, [51], in a configuration similar to FIG. 4D—drawn in FIG. 4E.

The additional intermediate level will simply reduce the energy losses to roughly the ratio between the size of the two points, the larger point created by the first level of point positioning, and the diffraction limited size on the DMD or SLM. Additionally, as in FIG. 4C, and FIG. 4D, several points can be illuminated simultaneously.

The geometry of the system had been described, for simplicity, in this paragraph, assuming that the scanning device is positioned at the entrance of the system. This configuration is plausible, assuming that the beam shaper, obey adequate optical constraints, mainly Telecentricity. The beam shaper can also be positioned before the scanning device, which will manipulate the distributions directly. Practically this solution may be simpler, but both solutions are adequate and engineering aspects will determine the choice between the two configurations.

In another embodiment, of the multiple synchronized points light distribution, can be created, using a Wave shaping DMD or SLM, positioned at the pupil of the system in a configuration similar to those used for example in {Ritsch-Marte, 2009 #39} or similar publications.

In another embodiment, of the multiple synchronized points light distribution, can be created, by a multichannel Acousto- or electro-optic deflector, as described as a commercial product by the company G&H, gandh.com/product-categories/multi-channel-modulators-aomc/, as accessed on Dec. 2, 2020, or by a very fast Acousto- or electro-optic deflector, to acquire quasi simultaneous points.

Description of Embodiments of the Present Invention: Simplified Cartesian Algorithms and Control System We present in FIG. 5, a family of simplified cartesian algorithms and control system for dark tracking and dark addressing.

Figure 5A:
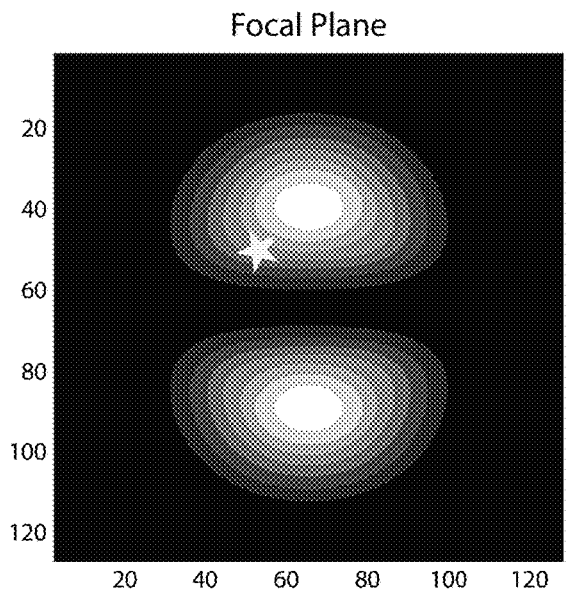
FIG. 5A and FIG. 5B, represents horizontal and vertical symmetrical patterns of light distributions.

Assuming a horizontal pattern, represented in FIG. 5A, the position x of an emitter, materialized by a star on the Figure, relative to the central reference line, along the y axis, is directly dependent on the energy; the theoretical function is, in Conical Diffraction patterns a parabolic dependance, but the actual dependance can be calibrated using a suitable procedure to take into account small discrepancy. A potential—small—dependance of the orthogonal directions can also be considered by the procedure.

Figure 5B:
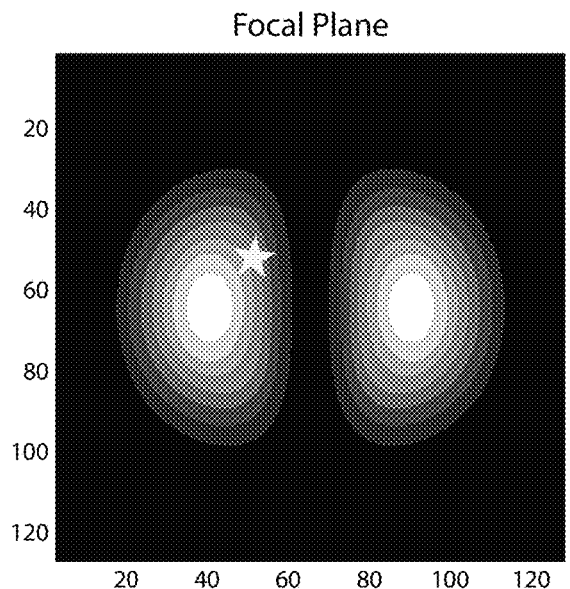

Assuming a vertical pattern, represented in FIG. 5B, the position y of an emitter, materialized by a star on the Figure, relative to the central reference line, along the x axis, is directly dependent on the energy; the theoretical function is, in Conical Diffraction patterns a parabolic dependance but the actual dependance can be calibrated using a suitable procedure to take into account small discrepancy. A potential—small—dependance of the energy due to the orthogonal directions can also be considered by the procedure.

Figure 5C:
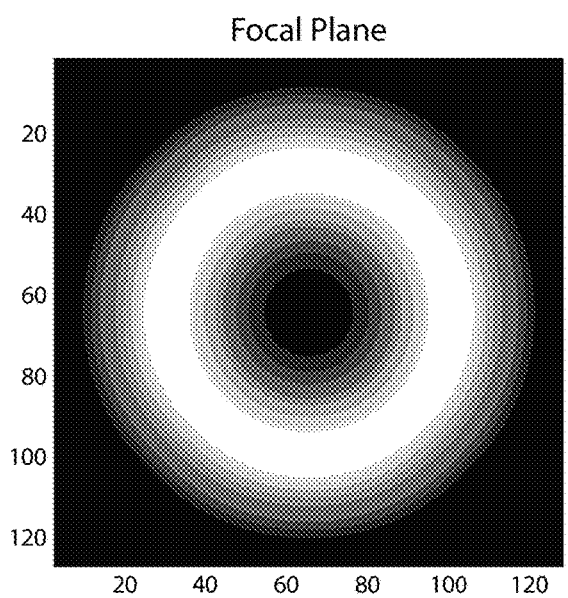
FIGS. 5C-5E represents an axial dependent pattern, of light distributions, described in {Shut, 2016 #11}.
Figure 5D:
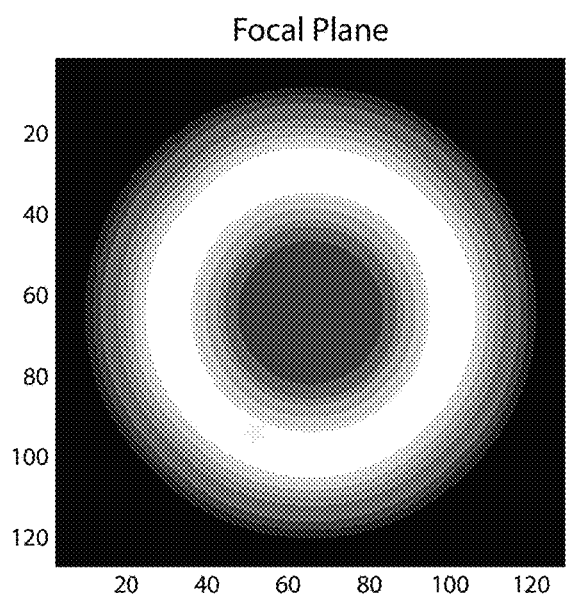
Figure 5E:
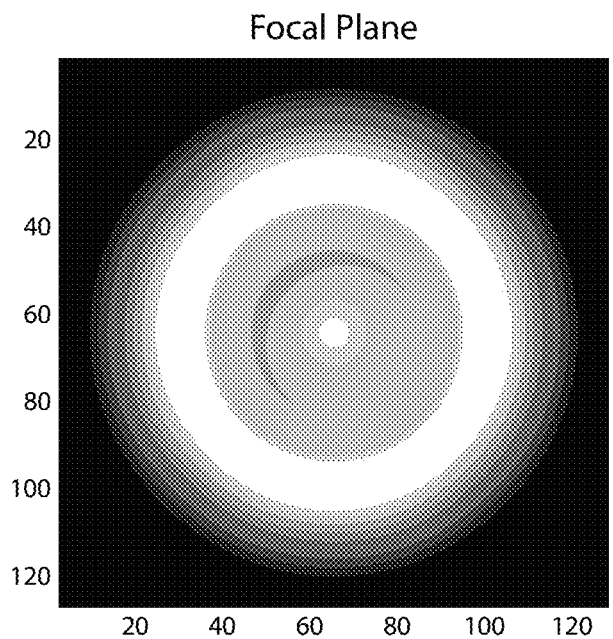
Figure 5F:
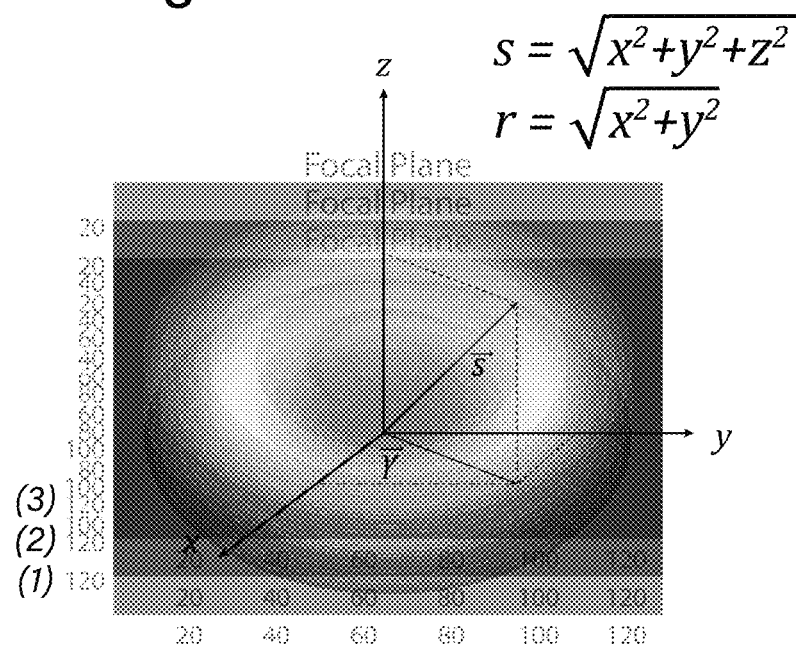
FIG. 5F, describes the relative geometry of the distributions and the emitter.

Assuming an axial dependent pattern, described in {Sirat, 2016 #11} represented in FIGS. 5C-5E, the energy is dependent of the position s, the distance in three-dimensions between an emitter and the 3D central point of the distributions. FIGS. 5C-5E represent 3 cuts, Represented as FIG. 5C, FIG. 5D and FIG. 5E at different axial positions, namely, (1) at focus, (2) at an axial position of 0.1 Rayleigh range, and (3) at an axial position of 0.2 Rayleigh range. At focus, if the point will have been at focus AND at the zero of the x-y coordinates, we will have gotten a zero of energy, in this distribution as described in {Sirat, 2016 #11} and subsequent patents. The theoretical function is, in Conical Diffraction patterns, a parabolic dependance, either of s, or a known combination of z and r, (FIG. 5F), r being the lateral projected distance between the points ($r=\sqrt{x^2+y^2}$). The calculation may use the theoretical function or can be calibrated using a suitable procedure to consider small discrepancy. The dependance of the energy due the orthogonal directions must also be considered by the procedure.

The same procedure can be used with any of the axial dependent distributions, including all axial dependent distributions described in the inventions of the inventor, including but not limited to {Sirat, 2016 #11; Sirat, 2017 #8; Sirat, 2017 #12; Sirat, 2017 #31; Sirat, 2016 #36; Sirat, 2017 #34}, featuring a zero of energy, and other known axial dependent distributions, as known to the Man skilled in Art.

Even if the preferred embodiment is featuring a common zero of the lateral and axial dependent distributions, which simplifies much the algorithm, as described in FIG. 5, other embodiments can be implemented with other conditions, with some tolerance on the commonality of the zero of the distributions, with either a penalty in photons cost or either the need for an additional movement of one distribution relative to the other(s).

We present in the same FIG. 5, a second simplified cartesian algorithm.

Figure 5G:
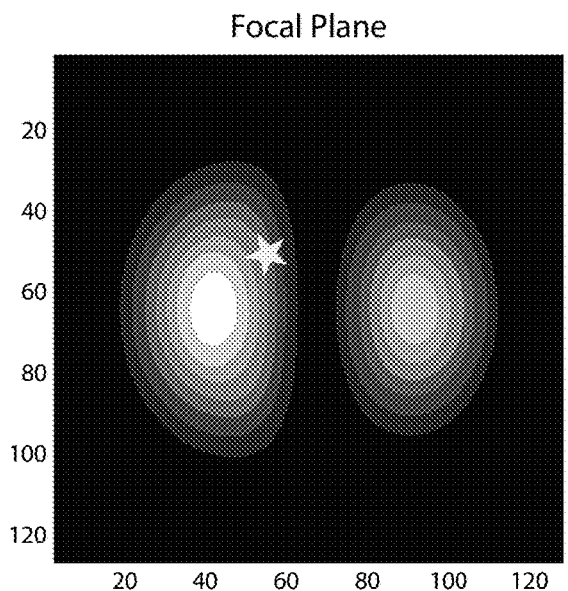
FIG. 5G to FIG. 5J, represents horizontal and vertical asymmetrical patterns of light distributions; the position of the emitter is materialized by a star on these Figures.
Figure 5H:
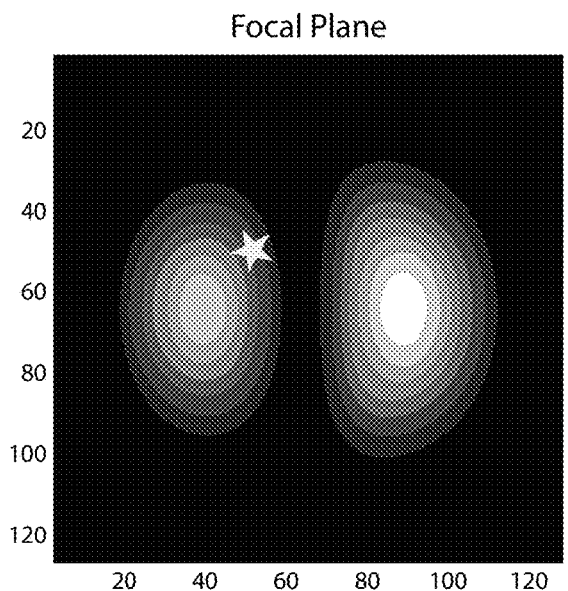

Assuming a first horizontal pattern, represented in Figure FIG. 5G, as an asymmetric version of the pattern described in FIG. 5A, and a second horizontal pattern, represented in FIG. 5H, as an asymmetric version of the pattern described in FIG. 5A, being a mirror image of the pattern of FIG. 5G. Both of these patterns can be created using CODIM—Conical Diffraction Microscopy, by an adequate choice of input and output polarisations. The position x of an emitter, materialized by a star, relative to the central reference line, along the y axis, is directly dependent on the sum of the energy collected by the two measurements; the direction of the x position can be measured through the comparison of the two patterns yielding a measurement value which sign—positive or negative—depends on the comparison of the two energies. The theoretical function is, in Conical Diffraction patterns a parabolic dependance, but the actual dependance can be calibrated using a suitable procedure to consider small discrepancy. A potential—small—dependance of the orthogonal directions can also be considered by the procedure.

Figure 5I:
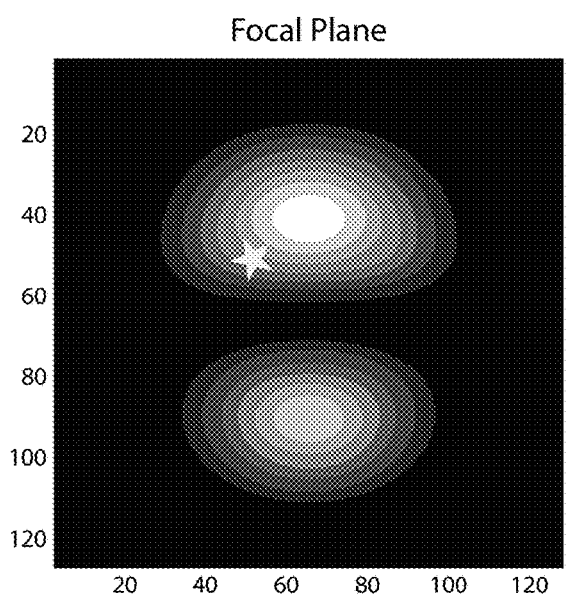
Figure 5J:
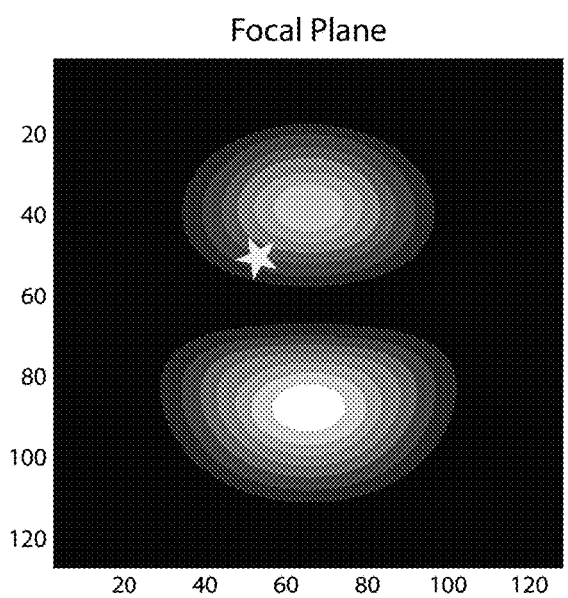

Assuming two vertical patterns, FIG. 5I and FIG. 5J, which behave—mutatis mutandis—in a way similar to the horizontal patterns.

The patterns FIG. 5A to FIG. 5J (excluding FIG. 5F), symmetrical or asymmetrical, can be created, at an angle (3, chosen to optimize the parameters of the measurement or of the system, instead of horizontal or vertical axis described above.

Any of the measurements created by projecting a sequence of these patterns, or combinations thereof, either at the same position of the emitter, measured simultaneously or quasi-simultaneously, or as a time-dependent sequence, or in conjunction to a movement, either imposed by the operator or created naturally, augmented by simple mathematical procedures known to the man skilled in art, creates a simple deterministic lateral, axial or three-dimensional measurement procedure. These measurements can also be coupled with additional information to yield accurate positioning.

For example, the symmetric pattern measurement is simpler, and in some cases more accurate, in the case that the position polarity is known from external or previous information. Any combination of these measurements, and all of their direct and obvious derivatives can be—and will be—used in order to maximize the precision, minimize the time, and the number of photons required for a measurement.

Additionally, a model validation index, imod can be calculated. This index will assert that the measurements are, within a reasonable tolerance, fitting the model defined. It will assert the assumptions of the model.

As an example, if the model assumes that the object is a single luminous point, the 4 measurements of the second simplified algorithm described above, have some predetermined relationship. Departure from this constraints will allow detecting outliers, a major issue in many localization techniques.

This detection, at the lowest level of information, the raw data is the most reliable way to avoid errors and mistakes.

Moreover, the model validation index can be extended, for example by adding additional measurements, to recognize and quantify additional cases, as described as metrology above. The recognition process can be either a predetermined relationship, either from theoretical, experimental or functional grounds, and may even uses Deep learning techniques as a continuation of {Sirat, 2017 #12}.

Description of Embodiments of the Present Invention: Electronics

In another embodiment, an electronic design, optimized for this invention, for all CODIM systems, and for all optical setups using Pockels cell in a set of fixed polarization states, is described. Assuming the use of a single or double Pockels cell to control the polarization state, one of the limit of practical devices is the requirement to switch from one polarization state to another at high rate. Even if High Voltage Amplifiers and DC to DC voltage sources are available commercially, the requirement to switch from one state to another, for Kilovolt voltages at high speed, requires high currents and expensive devices. An alternate solution, described in this invention, taking advantage to the fact that a Pockels cell is electrically a low capacitance, in the pF range, is to materialize a small number of voltage values, by charging relative large capacitors, in the nF or above range, beforehand, at reasonable current level, and connecting them when required to the Pockels cell. In an additional and complementary embodiment, taking advantage that the Pockels cell is a two electrodes device and that the voltage creating the optical effect is the difference between the voltage applied on the two electrodes, a—much—lower Voltage Amplifier or DC-to-DC converter is used, either to compensate for drop in the voltage of the large capacitance or to switch between nearby states, as for example the states described in FIG. 5G and FIG. 5H, or the states described in FIG. 5I and FIG. 5J. Assuming the voltage on the large capacitance and/or on the Pockels cell is monitored, using means known to the man skilled in Art, in another embodiment, a control system is added to refresh, when required, the voltage on the large capacitances, taking advantage of the time when other polarization states are applied to the Pockels.

The references listed below are hereby incorporated herein by reference.

REFERENCES

Balzarotti, F., Y. Eilers, K. C. Gwosch, A. H. Gynnå, V. Westphal, F. D. Stefani, J. Elf and S. W. Hell (2017). "Nanometer resolution imaging and tracking of fluorescent molecules with minimal photon fluxes." *Science* 355(6325): 606-612.
Berry, M. (2004). "Conical diffraction asymptotics: fine structure of Poggendorff rings and axial spike." *Journal of Optics A: Pure and Applied Optics* 6(4): 289.
Cnossen, J., T. Hinsdale, R. Ø. Thorsen, F. Schueder, R. Jungmann, C. S. Smith, B. Rieger and S. Stallinga (2019). "Localization microscopy at doubled precision with patterned illumination." *bioRxiv:* 554337.
contributors, S.-r. m. W. (2019). "Super-resolution microscopy. In Wikipedia."
Fallet, C., M. Dubois, J.-Y. Tinevez, S. Oddos, J. Caron, R. Persson, S. L. Shorte and G. Y. Sirat (2015). *A new method to achieve tens of nm axial super-localization based on conical diffraction PSF shaping*. Single Molecule Spectroscopy and Superresolution Imaging VIII, International Society for Optics and Photonics.
Gauthier, G., I. Lenton, N. M. Parry, M. Baker, M. Davis, H. Rubinsztein-Dunlop and T. Neely (2016). "Direct imaging of a digital-micromirror device for configurable microscopic optical potentials." *Optica* 3(10): 1136-1143.
Gu, L., Y. Li, S. Zhang, Y. Xue, W. Li, D. Li, T. Xu and W. Ji (2019). "Molecular resolution imaging by repetitive optical selective exposure." *Nature Methods* 16(11): 1114-1118.
Gwosch, K. C., J. K. Pape, F. Balzarotti, P. Hoess, J. Ellenberg, J. Ries and S. W. Hell (2019). "MINFLUX nanoscopy delivers multicolor nanometer 3D-resolution in (living) cells." *bioRxiv:* 734251.
Hamilton, W. R. (1831). "Third supplement to an essay on the theory of systems of rays." *The Transactions of the Royal Irish Academy*.
Hell, S. W. (2016). Method and apparatus for tracking a particle, particularly a single molecule, in a sample, Google Patents.
Jouchet, P., C. Cabriel, N. Bourg, M. Bardou, C. Poüs, E. Fort and S. Lévêque-Fort (2020). "In Depth 3D Single Molecule Localization Microscopy with Time Modulated Excitation." *Biophysical Journal* 118(3): 149a.
Lloyd, H. (1883). ""On the phenomena presented by light in its passage along the axes of biaxial crystals," Philos. Mag. 1, 112-120 and 207-210."
Lukosz, W. (1966). "Optical systems with resolving powers exceeding the classical limit." *JOSA* 56(11): 1463-1471.
Martens, K. J., A. Jabermoradi, S. Yang and J. Hohlbein (2020). "Integrating engineered point spread functions into the phasor-based single-molecule localization microscopy framework." *Methods*.
Pavani, S. R. P., M. A. Thompson, J. S. Biteen, S. J. Lord, N. Liu, R. J. Twieg, R. Piestun and W. Moerner (2009). "Three-dimensional, single-molecule fluorescence imaging beyond the diffraction limit by using a double-helix point spread function." *Proceedings of the National Academy of Sciences* 106(9): 2995-2999.
Reymond, L., J. Ziegler, C. Knapp, F.-C. Wang, T. Huser, V. Ruprecht and S. Wieser (2019). "SIMPLE: Structured illumination based point localization estimator with enhanced precision." *Optics express* 27(17): 24578-24590.
Schermelleh, L., R. Heintzmann and H. Leonhardt (2010). "A guide to super-resolution fluorescence microscopy." *Journal of Cell Biology* 190(2): 165-175.
Sirat, G. Y. (2016). Method and device for superresolution optical measurement using singular optics, Google Patents.
Sirat, G. Y. (2017). Method and device for superresolution optical measurement using singular optics, Google Patents.
Sirat, G. Y. (2017). "Superresolution metrology methods based on singular distributions and deep learning." WO2019043458A2.

I claim:

1. A method for determining a position in three dimensions of a light-emitting object in a sample, the method comprising:
   characterizing two of the dimensions of the position in a first coordinate system using an Abbe's loophole technique, by projecting along a first projection axis, onto a part of the sample including the light-emitting object, a first set of distributions of optical radiation having zero intensity at a common center of each of the distributions of the set, and while measuring the intensity of the light emitted, moving the set of distributions to a first location on the object wherein the light emissions are at a minimum, the first location already characterizing such two of the dimensions; and
   using an optical module to shape the light emitted from the object, before detecting the light, in a manner wherein a resulting shape depends on an axial position of the object, recording the shape and the overall intensity, and using the resulting shape measurement to determine the axial position.

2. A method according to claim 1, further comprising determining the position of the light-emitting object, with even higher accuracy, by characterizing all three of the dimensions of the position in a second coordinate system using the Abbe's loophole technique, by projecting along a second projection axis onto the object a second set of distributions of optical radiation having zero intensity at the three-dimensional position of each of the distributions of the set, determined according to claim 1, and moving the set of distributions to a second location on the object wherein the light emissions are at a minimum, the second location characterizing all three dimensions.

3. A method for determining the position in three dimensions of the light-emitting object according to claim 1, the method further comprising, before characterizing two of the dimensions of the position in the first coordinate system, acquiring a rough estimation of the position of two- or three-dimensional position of the light-emitting object, by standard localization or imaging methods.

4. A method for determining the position in three dimensions of the light-emitting object, according claim 1, further comprising, in the course of projecting a set distributions selected from the group consisting of the first set and second set of distributions and combinations thereof, onto the light-emitting object, measuring the intensity of light emitted along a selected Cartesian axis in a delimited region thereof including a location having minimum intensity, wherein such intensity along such Cartesian axis yields a measure of the position of the light-emitting object along such Cartesian axis, decorrelated from position of the light-emitting object along other axes.

5. A method according to claim 4, wherein the set of distributions includes at least two distributions.

6. A method for determining a position in three dimensions of a light-emitting object, according to claim 4, wherein the set of distributions of optical radiation having zero intensity at a common center of each of the distributions of the set, is chosen such that the set of values measured from the intensities and shapes is selected from the group consisting of redundant and over determined, in order to provide validation of the determined position.

7. A method for determining a position in two or three dimensions of a set of separated light-emitting objects in a sample, the method comprising:

characterizing, using an Abbe's loophole technique, two or three of the dimensions of the position of each one of the separated light emitting objects, by projecting, using a scanning device, along a projection axis, onto each object of the set of objects, a set of distributions of optical radiation having zero intensity at a common center, in two or three dimensions, of each of the distributions of the set of distributions, the center being different for each object of the set of objects, and while measuring the intensity of the light emitted, moving the center of the set of distributions, by using the scanning device, separately for each object of the set of objects, to a location on the object of the set of objects, wherein the light emissions are at a minimum, the location already characterizing at least two dimensions.

8. A method according to claim 7, wherein the scanning device is a SLM or a DMD, positioned at a plane conjugate to the sample, and the scanning device is operating, for a SLM or a DMD, in a mode that either only pixels conjugated to the position of determined positions are in ON mode and the light collected is a direct path, or, alternatively, in a DMD, only pixels conjugated to the position of the emitters are in OFF mode and the light collected is an indirect path.

9. A method according to claim 7, wherein the size of a spot corresponding to the diffraction limit is larger than the pixel size, by a factor between 3 and 11.

10. A method according to claim 9, in which an algorithm is applied to determine an adequate combination of pixels ON and OFF, to position the centroid of the spot on the sample with resolution better than a single, full, pixel of the scanning device, projected on a sample plane.

11. A method according to claim 7, wherein a first optical module is used to create a light distribution including an emitter's position as part of an illumination domain.

12. A method according to claim 7, wherein the scanning device is selected from the group consisting of a multichannel acousto- or electro-optic deflector and a Wavefront shaper, and combinations thereof.

* * * * *